(12) United States Patent
Chen

(10) Patent No.: US 8,786,843 B2
(45) Date of Patent: Jul. 22, 2014

(54) TESTING OF PASSIVE OPTICAL COMPONENTS

(75) Inventor: David Zhi Chen, Richardson, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 215 days.

(21) Appl. No.: 13/411,866

(22) Filed: Mar. 5, 2012

(65) Prior Publication Data

US 2013/0229648 A1 Sep. 5, 2013

(51) Int. Cl.
*G01N 21/00* (2006.01)

(52) U.S. Cl.
USPC .......................................................... 356/73

(58) Field of Classification Search
USPC .................................................... 356/72–73
See application file for complete search history.

(56) References Cited

U.S. PATENT DOCUMENTS

2004/0264908 A1* 12/2004 Calabrese et al. ............ 385/140

\* cited by examiner

*Primary Examiner* — Tarifur Chowdhury
*Assistant Examiner* — Abdullahi Nur

(57) ABSTRACT

Methods and devices provide for transmitting a series of optical signals within a range of an O-band through a U-band into a device under test comprising one or more passive optical components; measuring powers of the optical signals that propagated through the device under test; calculating wavelength-dependent insertion loss values based on the measured power of the optical signals; measuring powers of reflected portions of the optical signals that propagated through the device under test; and calculating wavelength-dependent return loss values based on the measured powers of the reflected portion of the optical signal.

21 Claims, 20 Drawing Sheets

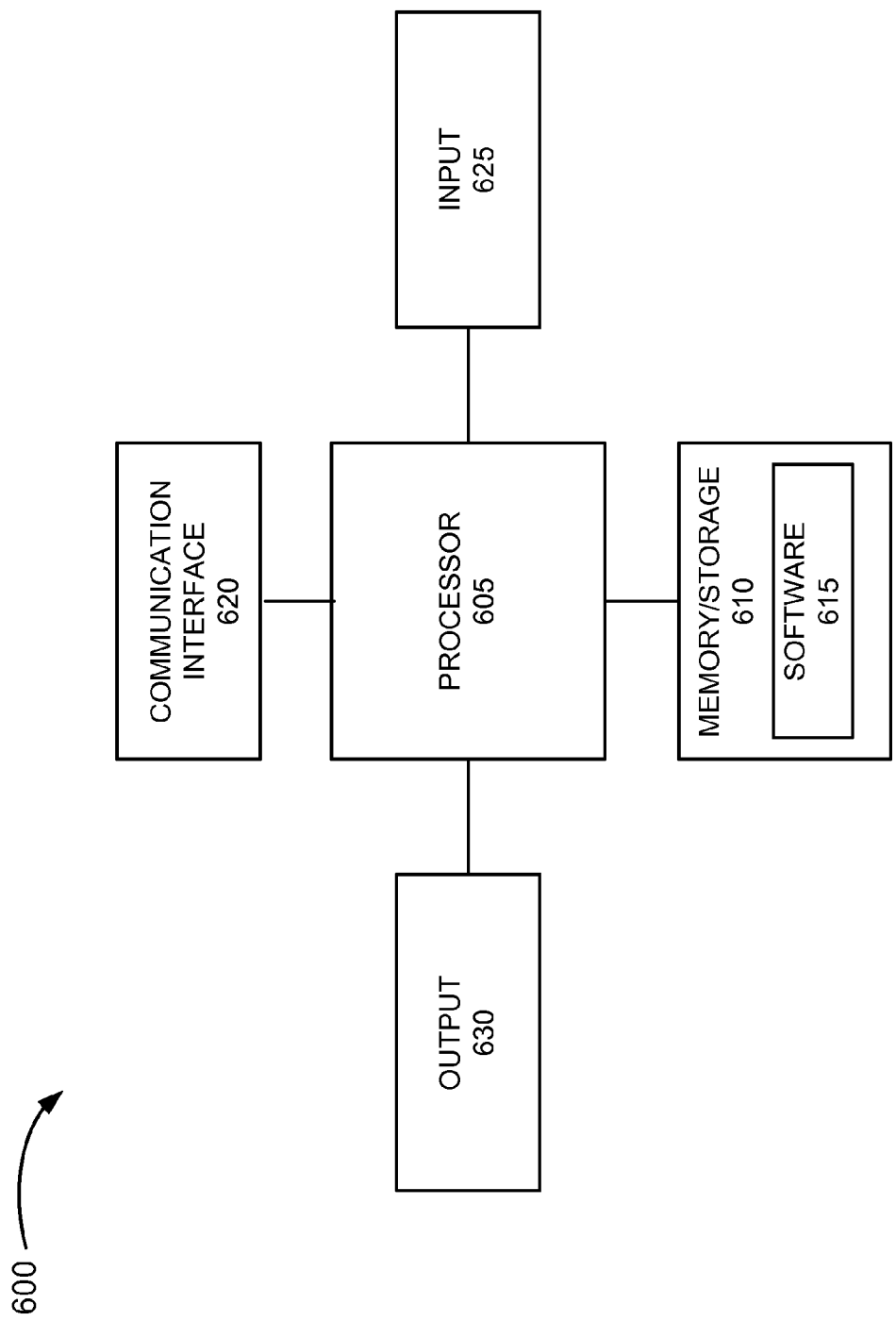

TESTING OF PASSIVE OPTICAL COMPONENTS

BACKGROUND

Passive optical components are tested for performance and reliability in accordance with various national and international standards.

BRIEF DESCRIPTION OF THE DRAWINGS

FIG. 6 is a diagram illustrating exemplary components of a device that may correspond to one or more of the devices of the test systems depicted in FIGS. 1, 3, and 5A;

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

The type of testing for passive optical components is, in part, influenced by the standards and/or requirements (e.g., Generic Requirements (GR), military (MIL) standards, Telecommunications Industry Association/Electronic Industries Alliance (TIA/EIA) standards, etc.) with which the passive optical components are expected to meet or comply. Additionally, the type of testing at a system-level often includes testing of well-known performance metrics, such as bit-error rate, etc.

A passive optical component may have linear and non-linear loss and/or interference characterizations based on the wavelength of an optical signal. Currently, the industry does not require testing for these types of characterization in the very broad bands, such as S, C, L, O, U, and E bands, nor is there a test system capable of performing these types of tests. These bands characterization and test will become a norm in the future.

According to an exemplary embodiment, a test system is capable of testing one or multiple passive optical components in cascaded form or in parallel form (also referred to as device under test (DUT)). According to an exemplary embodiment, the test system is capable of testing wavelength-dependent loss, polarization loss, and interference pertaining to one or multiple passive optical components. For example, the test system is capable of testing wavelength dependent insertion loss, wavelength-dependent return loss, wavelength-dependent polarization loss, and wavelength-dependent multi-path interference (MPI).

According to an exemplary embodiment, the test system is capable of testing across all bands. According to an exemplary embodiment, the bands include the O-band (e.g., 1260-1360 nm), the E-band (e.g., 1360-1460 nm), the S-band (e.g., 1460-1530 nm), C-band (e.g., 1530-1565), the L-band (e.g., 1565-1625), and the U-band (e.g., 1625-1675 nm). This is in contrast to conventional testing approaches in which a test only covers one band or a portion of a band. According to another exemplary embodiment, test system is capable of testing across fewer than all bands and a particular wavelength.

According to an exemplary embodiment, the test system is capable of collecting test data in real-time and storing the test data. According to an exemplary embodiment, the test system is capable of analyzing the test data and generating a characterization for the device under test. According to an exemplary embodiment, the test system may be implemented in a lab or a testbed setting (e.g., for developmental testing, characterizations, certifications, etc.) or in the field (e.g., for deployed passive optical components, etc.).

Figure 1:
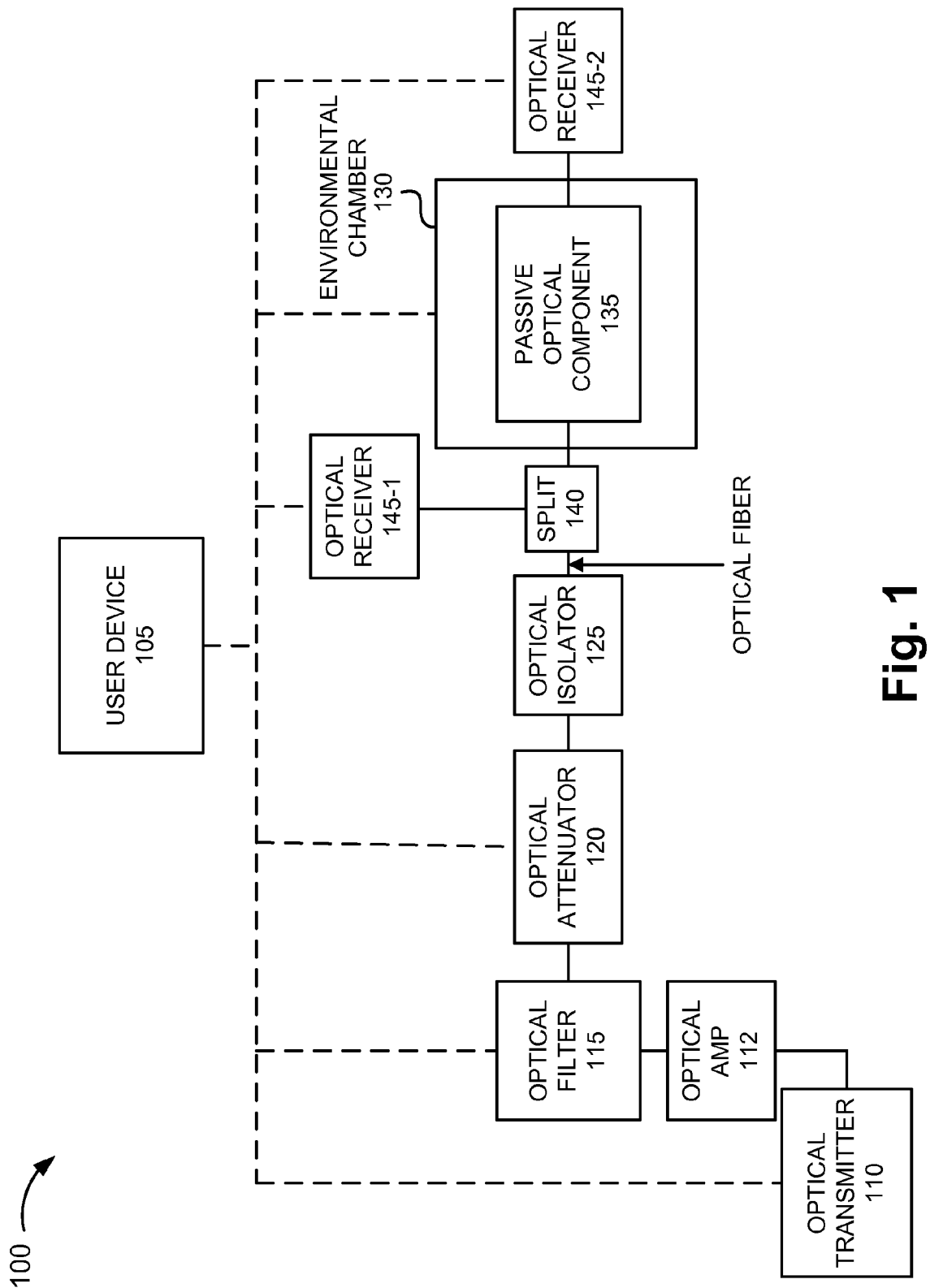
FIG. 1 is a diagram illustrating an exemplary embodiment of a test system capable of testing a device under test.

FIG. 1 is a diagram illustrating an exemplary embodiment of a test system 100 to test one or multiple passive optical components. For example, test system 100 is capable of testing wavelength-dependent loss of a device under test, such as a passive optical component, across all bands. As illustrated, test system 100 includes a user device 105, an optical transmitter 110, an optical amplifier 112, an optical filter 115, an optical attenuator 120, an optical isolator 125, an environmental chamber 130, an optical splitter 140, and optical receivers 145-1 and 145-2 (also referred to individually as optical receiver 145 or collectively as optical receivers 145). FIG. 1 also illustrates a device under test (e.g., a passive optical component 135) in environmental chamber 130.

The number of components and the configuration of test system 100 are exemplary. According to other embodiments, test system 100 may include additional components, fewer components, different components, and/or differently arranged components, than those illustrated in FIG. 1. For example, test system 100 may not include optical filter 115 and/or optical attenuator 120. That is, depending on the capabilities of optical transmitter 110 to provide levels of granularity of wavelength and/or power (e.g., fineness or coarseness), optical filter 115 and/or optical attenuator 120 may be omitted from test system 100.

According to other embodiments, a single component depicted in FIG. 1 may be implemented as multiple components. For example, optical transmitter 110 and/or optical filter 115 may be implemented as multiple optical transmitters 110 and/or multiple optical filters 115. According to other embodiments, multiple components depicted in FIG. 1 may be implemented as a single component. For example, optical receiver 145-1 and 145-2 may be implemented as a single optical receiver 145. Additionally, test system 100 may be implemented having a different order of components along an optical signal path than the order of components illustrated in FIG. 1.

The connections between the components of test system 100 are exemplary. As illustrated in FIG. 1, a connection between components includes an optical fiber (e.g., fiber optic patch cable). According to an exemplary implementation, the optical fiber is a single-mode fiber (e.g. ITU-T G.652.D standard, etc.). According to an exemplary embodiment, user device 105 is communicatively coupled to other components of test system 100, as indicated by the dashed lines depicted in FIG. 1. According to another exemplary embodiment, user device 105 is not communicatively coupled to one or multiple other components of test system 100. For example, a component may be configured manually by a tester for testing purposes. Thus, depending on the communicative capabilities of a particular component, such component may or may not be communicatively coupled to user device 105.

User device 105 includes a computational device. For example, user device 105 may be implemented as a computer. According to an exemplary embodiment, user device 105 includes software that provides various user interfaces to allow a user to control other components of test system 100 and conduct tests. For example, the user may configure various test parameters, control the operation of test system 100, and obtain test data pertaining to tests that are conducted. According to an exemplary embodiment, user device 105 includes software to store and manage the test data and generate characterizations pertaining to a device under test. User device 105 is described further below.

Optical transmitter 110 includes a component capable of generating and transmitting an optical signal. For example, optical transmitter 110 may be implemented as a wavelength-tunable laser source or an optical broadband light source. Optical transmitter 110 may also include power adjustment capabilities. For example, optical transmitter 110 includes an amplifier. According to an exemplary implementation, optical transmitter 110 is capable of generating and transmitting optical signals of various wavelengths. For example, optical transmitter 110 may generate and transmit optical signals in the O-band (e.g., 1260-1360 nm), the E-band (e.g., 1360-1460 nm), the S-band (e.g., 1460-1530 nm), C-band (e.g., 1530-1565), the L-band (e.g., 1565-1625), and the U-band (e.g., 1625-1675 nm). Given the range of bands, optical transmitter 110 may be replaced (e.g., for conducting a test) in order to cover all bands. That is, test system 100 is not limited to use one type of optical transmitter. Optical amplifier 112 and optical attenuator 120 are capable of managing power level responses and band overlapping issues. Optical transmitter 110 may also provide different modulation schemes (e.g., non-return-to-zero (NRZ), return-to-zero (RZ), etc.), baud rates (xx bit/s, such as 10 Gb/s), etc.

As previously described, the test systems described herein provide for the testing of wavelength-dependent losses and interference. Given the various wavelengths and/or bands that may be tested, other components (e.g., optical amplifier 112, optical filter 115, optical receiver 145, etc.) of the test systems are also capable of handling various wavelengths and/or bands (e.g., O-band, E-band, S-band, C-band, etc.).

Optical amplifier 112 includes a component capable of modifying (e.g., increasing or decreasing) the power of an optical signal. Optical filter 115 includes a component capable of wavelength filtering. For example, optical filter 115 may be implemented as a tunable optical filter. Optical attenuator 120 includes a component capable of adjusting optical power. For example, optical attenuator 120 may be implemented as a variable optical attenuator.

Optical isolator 125 includes a component capable of allowing the transmission of an optical signal in one direction.

Environmental chamber 130 includes an enclosure or a structure capable of controlling one or multiple environmental parameters. For example, environmental chamber 130 may control temperature, humidity, and light.

Passive optical component 135 includes one or multiple passive optical components (also referred to as DUT). In the case of multiple passive optical components, the device under test may be configured, for example, in a cascaded manner or a parallel manner. There are numerous types of passive optical components that may be tested using test system 100. For example, passive optical component 135 may include a patch panel, an optical connector (e.g., a single connector, a multi-connector), an optical splicer, an optical filter, an optical fiber, an optical isolator, an optical splitter, an optical grating, an optical switch, and/or other device or component that does not require a source of power, etc.

Splitter 140 includes a component capable of splitting and/or providing an optical path for an optical signal. Optical receiver 145 includes a component capable of receiving an optical signal and performing a measurement. For example, optical receiver 145 may be implemented as an optical power meter or an optical spectrum analyzer.

Figure 2A:
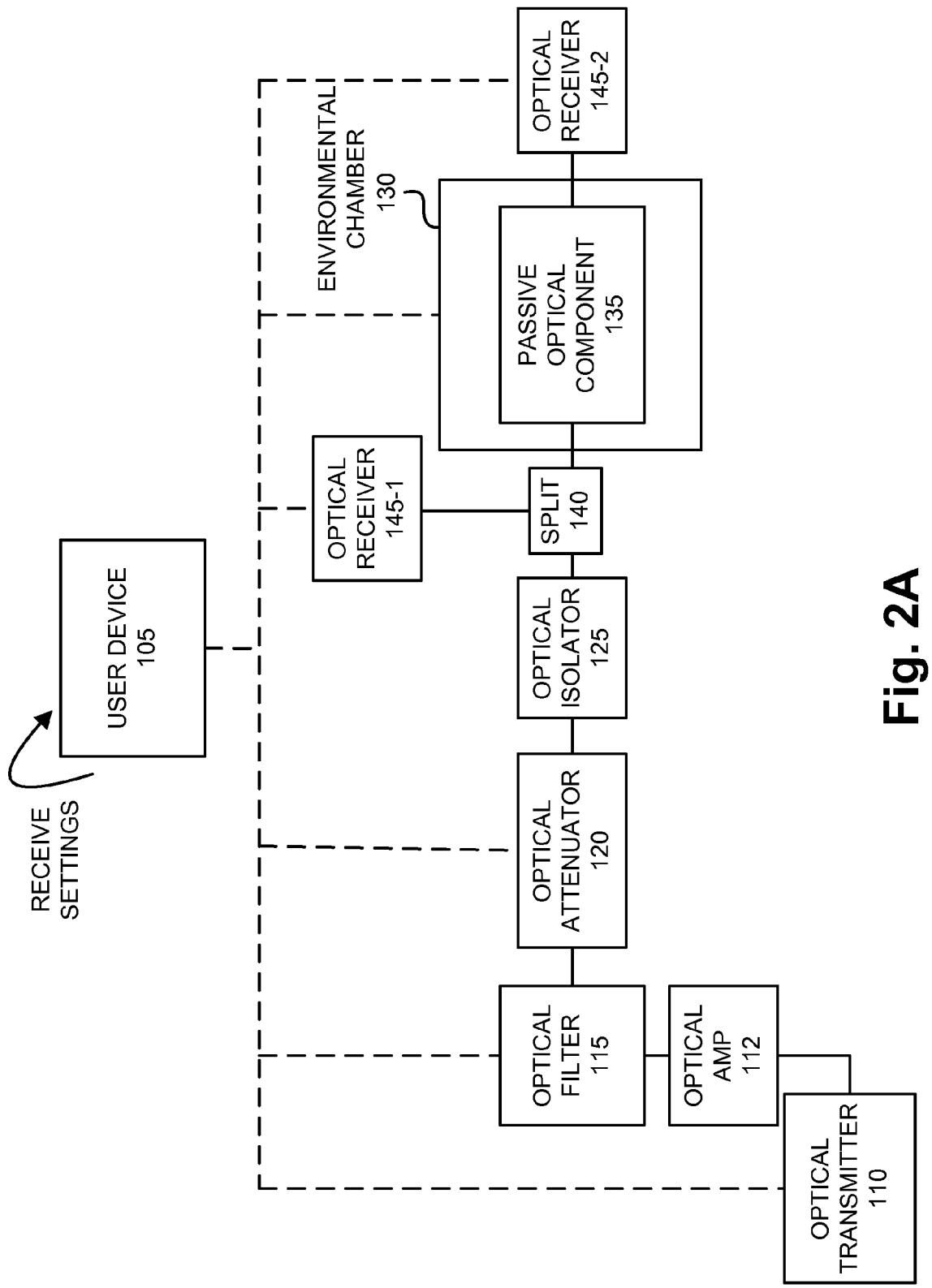
FIGS. 2A-2C are diagrams illustrating an exemplary process in which the test system is used to perform measurements of wavelength-dependent losses in relation to the device under test.
Figure 2B:
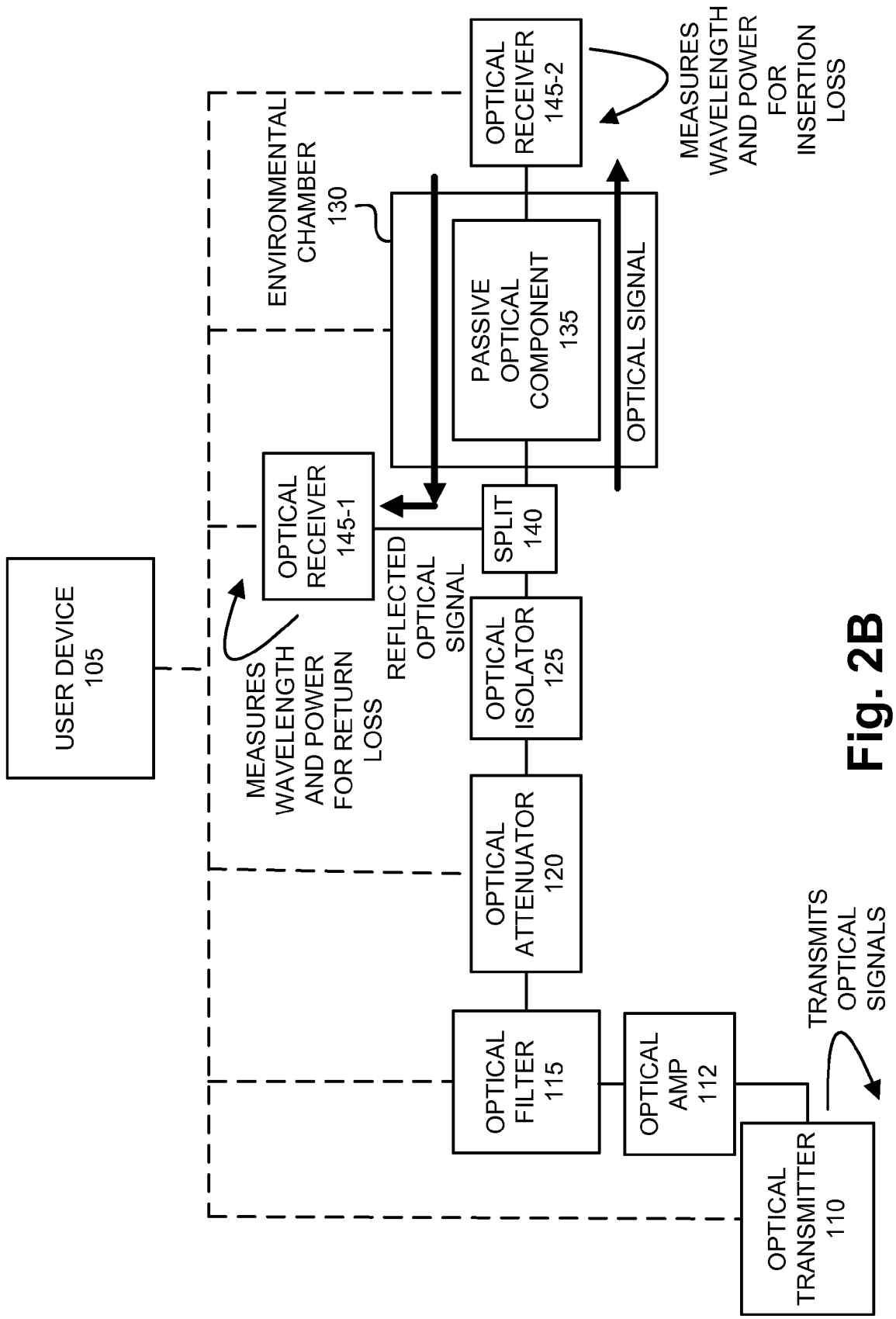
Figure 2C:
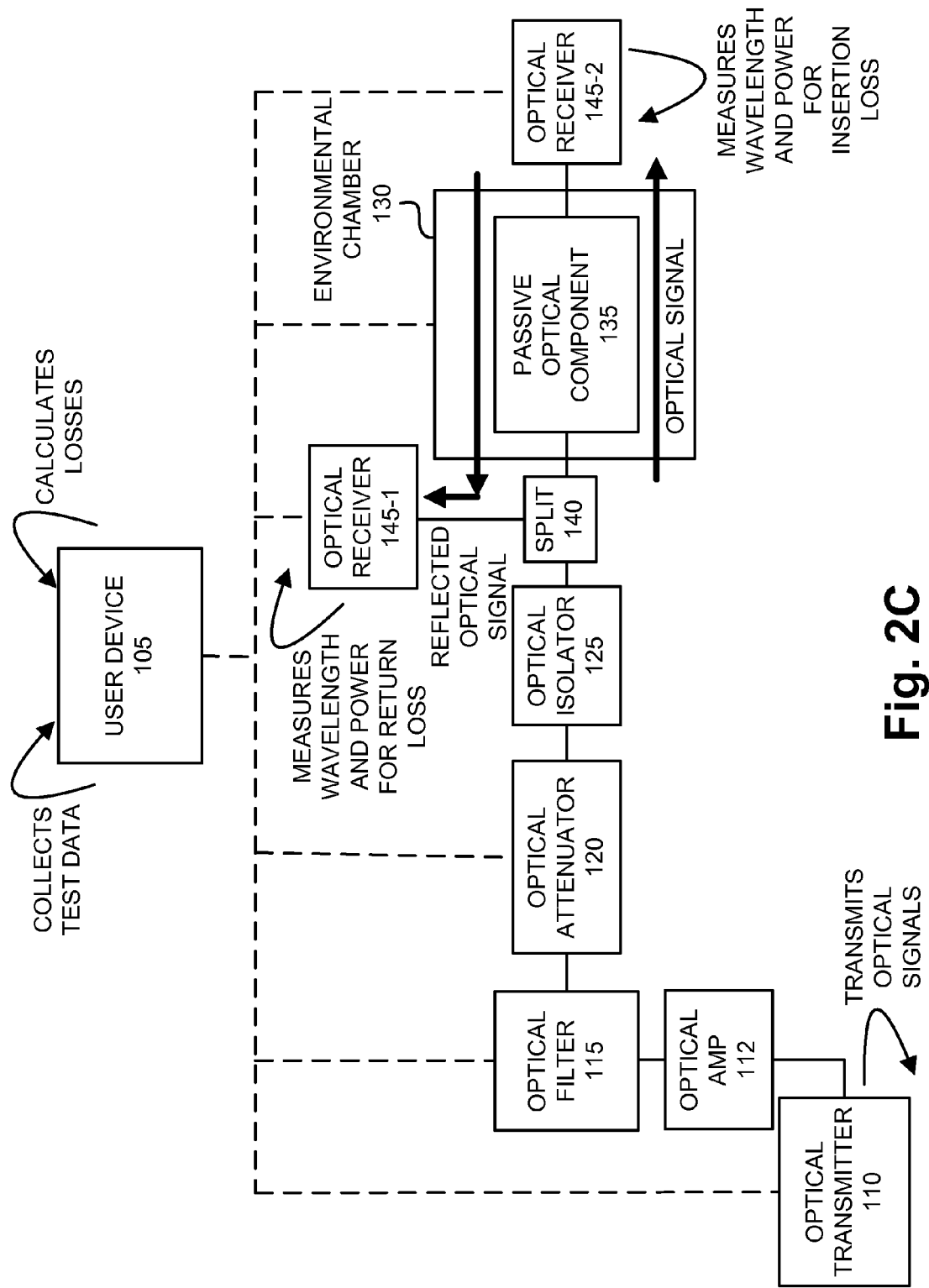

FIGS. 2A-2C are diagrams illustrating an exemplary process in which test system 100 is used to perform measurements of wavelength-dependent losses in relation to a device under test.

Referring to FIG. 2A, a user inputs via user device 105 various settings pertaining to the test. As previously described, user device 105 includes various user interfaces to allow a user to control other components of test system 100 and conduct tests. For example, the user is provided with a user interface to select global parameters pertaining to the test, such as duration of the test and equipment used (e.g., optical fiber used to connect components, type of optical transmitter, etc.). The user interface allows the user to enter and/or select information pertaining to the device under test, such as the passive optical component (e.g., type, model, manufacturer, etc.) and configuration information (e.g., cascaded, parallel, etc.). According to some scenarios, the tester may also input other types of information pertaining to the device under test. For example, the tester may purposely test a passive optical component that has a known defect, such as contamination (e.g., dirt, a scratch, a chip, etc.) to study the characterization of wavelength-dependent insertion loss and/or wavelength-dependent return loss. Alternatively, for example, the tester may purposely test a passive optical component that is configured with a known misalignment to study the characterization of wavelength-dependent insertion loss and/or wavelength dependent return loss.

The user interface also allows the user to enter and/or select information to configure one or multiple other components of test system 100. For example, the user interface allows the user to set parameters associated with optical transmitter 110, such as wavelength and power. For example, the user may set a range of wavelengths (e.g., 1460 nm-1625 nm, etc.) or one or more bands (e.g., O-band, S-band, C-band, etc.), a wavelength increment (e.g., 1 nm, etc.) to step through the range of wavelengths or one or more bands, and one or multiple power levels (e.g., 3 dBm, etc.). The user may also set other parameters, such as, for example, modulation, etc. Also, for example, the user interface may allow the user to set parameters associated with optical filter 115 and/or optical attenuator 120. For example, the user may set filtering parameters and/or power level parameters pertaining to these components.

The user may set parameters, via a user interface, pertaining to environmental chamber 130. For example, the user may set temperature parameters, humidity parameters, and/or light parameters (e.g., ultraviolet (UV) light parameters). Environmental chamber 130 may also perform an aging test. For example, temperature and humidity may be performed, the results of which can be mapped into a product "end of life" performance predictions or risk assessment report The user interface may also allow the user to set parameters pertaining to receivers 145. According to an exemplary implementation, optical receiver 145-2 is used to measure power and wavelength on the transmission side to determine insertion loss and optical receiver 145-1 is used to measure power and wavelength on the reflection side to determine return loss.

Referring to FIG. 2B, assume the user begins the test and test system 100 operates based on the user settings. For example, optical transmitter 110 transmits optical signals of a particular wavelength and power that propagate to optical receiver 145-2 via passive optical component 135 and other components of test system 100. Optical receiver 145-2 measures the power of the optical signal. Optical 145-2 also measures or identifies the wavelength.

As further illustrated in FIG. 2B, splitter 140 provides an optical path for a reflected optical signal such that the reflected signal propagates to optical receiver 145-1. Optical receiver 145-1 measures power of the reflected optical signal. Optical receiver 145-1 also measures or identifies the wavelength.

Referring to FIG. 2C, user device 105 collects test data during the test. For example, user device 105 receives power and wavelength measurements from optical receivers 145. User device 105 calculates insertion loss. User device 105 also calculates return loss. For example, user device 105 includes algorithms to calculate wavelength-dependent insertion loss and wavelength-dependent return loss based on the test data and user settings (e.g., transmitted power and wavelength). User device 105 stores the wavelength-dependent insertion loss and return loss values. The process described and illustrated in FIGS. 2A-2C continues across all bands until the test is completed. User device 105 and other components of test system 100 may operate according to feedback loops and/or test configuration information.

Figure 3:
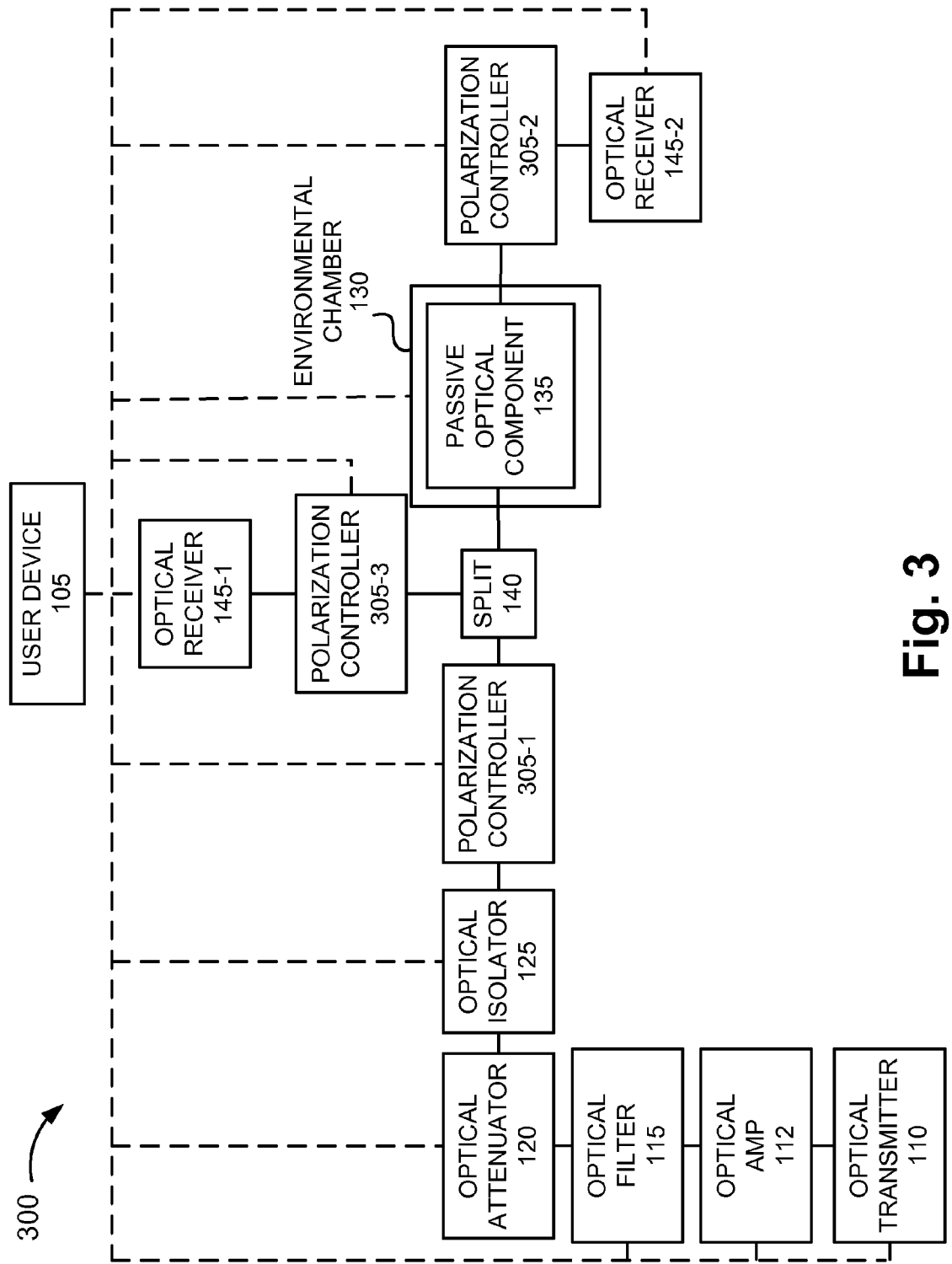
FIG. 3 is a diagram illustrating another exemplary embodiment of a test system capable of testing a device under test.

FIG. 3 is a diagram illustrating an exemplary embodiment of a test system 300 to test one or multiple passive optical components. For example, test system 300 is capable of testing wavelength-dependent polarization loss of a device under test, such as a passive optical component, across all bands. As illustrated, test system 300 includes user device 105, optical transmitter 110, optical filter 115, optical attenuator 120, polarization controllers 305-1 through 305-3 (also referred to individually as polarization controller 305 or collectively as polarization controllers 305), optical isolator 125, environmental chamber 130, optical splitter 140, and optical receivers 145. FIG. 3 also illustrates a device under test (e.g., passive optical component 135) in environmental chamber 130. User device 105, optical transmitter 110, optical attenuator 120, optical isolator 125, environmental chamber 130, optical splitter 140, optical receiver have been previously described.

The number of components and the configuration of test system 300 are exemplary. According to other embodiments, test system 300 may include additional components, fewer components, different components, and/or differently arranged components, than those illustrated in FIG. 3.

According to other embodiments, a single component depicted in FIG. 3 may be implemented as multiple components or multiple components depicted in FIG. 3 may be implemented as a single component. Additionally, test system 300 may be implemented having a different order of components along an optical signal path than the order of components illustrated in FIG. 3.

The connections between the components of test system 300 are exemplary. A connection between components includes an optical fiber (e.g., fiber optic patch cable). According to an exemplary implementation, the optical fiber is a single-mode fiber (e.g. ITU-T G.652.D standard, etc.). According to an exemplary embodiment, user device 105 is communicatively coupled to other components of test system 300, as indicated by the dashed lines.

Polarization controller 305 includes a component capable of creating a state of polarization of an optical signal. Polarization controller 305 also includes a component (e.g., a polarization analyzer) capable of measuring and/or analyzing polarization properties of an optical signal. For example, polarization controller 305 is capable of measuring the state of polarization (SOP). Polarization controller 305 may also be capable of measuring other parameters, such as polarization mode dispersion (PMD), polarization-dependent loss (PDL), average power, etc. Polarization controller 305 also includes a component (e.g., a polarization scrambler) capable of scrambling the state of polarization. For example, polarization scrambler is capable of making the degree of polarization a value of zero on time average.

As previously described, according to an exemplary embodiment, a test system (e.g., test system 100) is capable of testing wavelength-dependent insertion loss and wavelength dependent return loss. The wavelength-dependent insertion loss and the wavelength-dependent return loss may be measured in relation to the "O" through "U" bands. According to an exemplary embodiment, test system 300 includes polarization controller 305. According to an exemplary embodiment, a test system (e.g., test system 300) is capable of testing wavelength-dependent polarization loss. Additionally, the test system is capable of measuring the contribution of the wavelength-dependent polarization loss to the wavelength-dependent insertion loss and wavelength-dependent return loss.

Figure 4A:
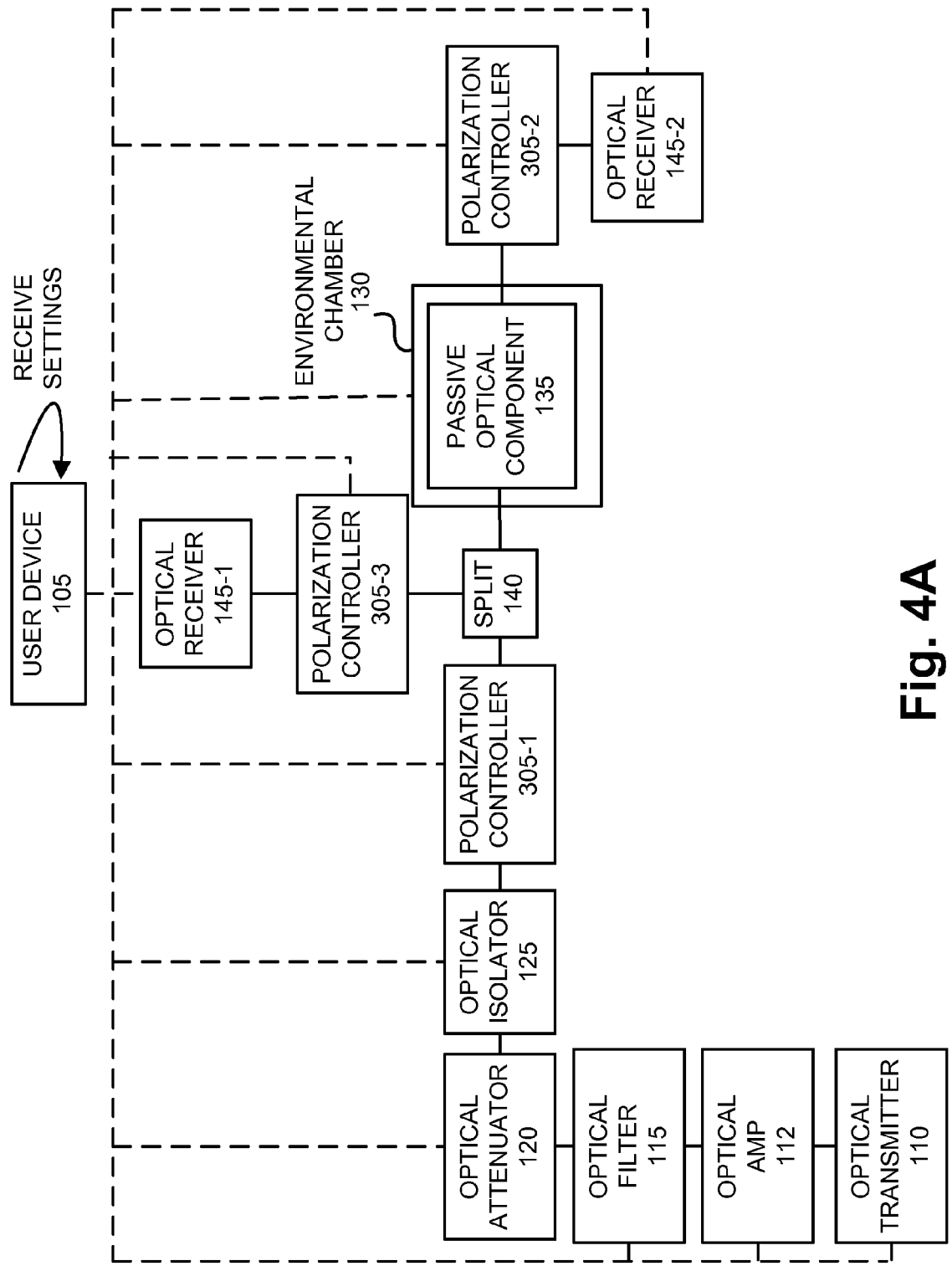
FIGS. 4A-4D are diagrams illustrating an exemplary process in which the test system is used to perform measurements of wavelength-dependent polarization dependent losses in relation to the device under test.
Figure 4B:
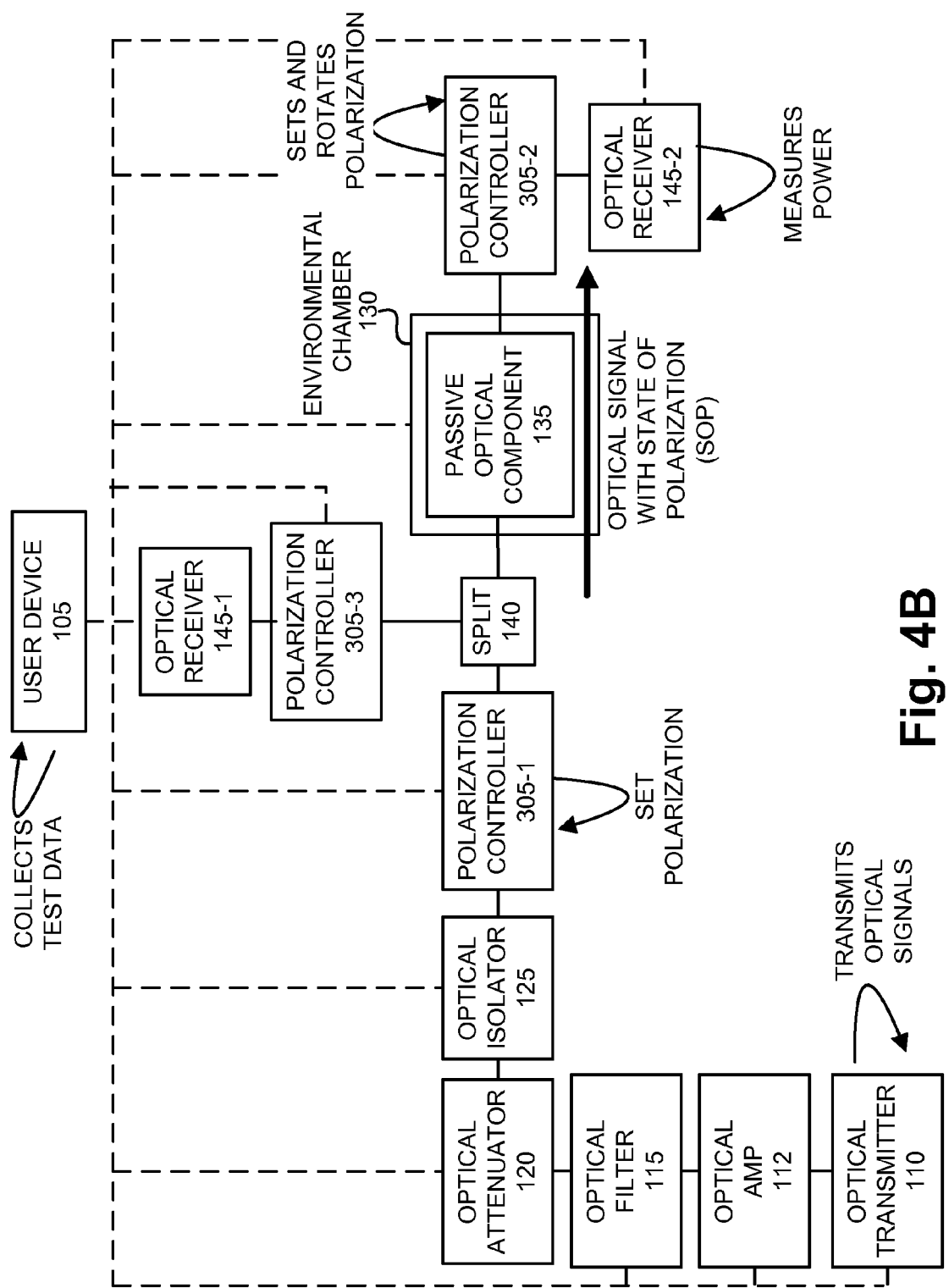
Figure 4C:
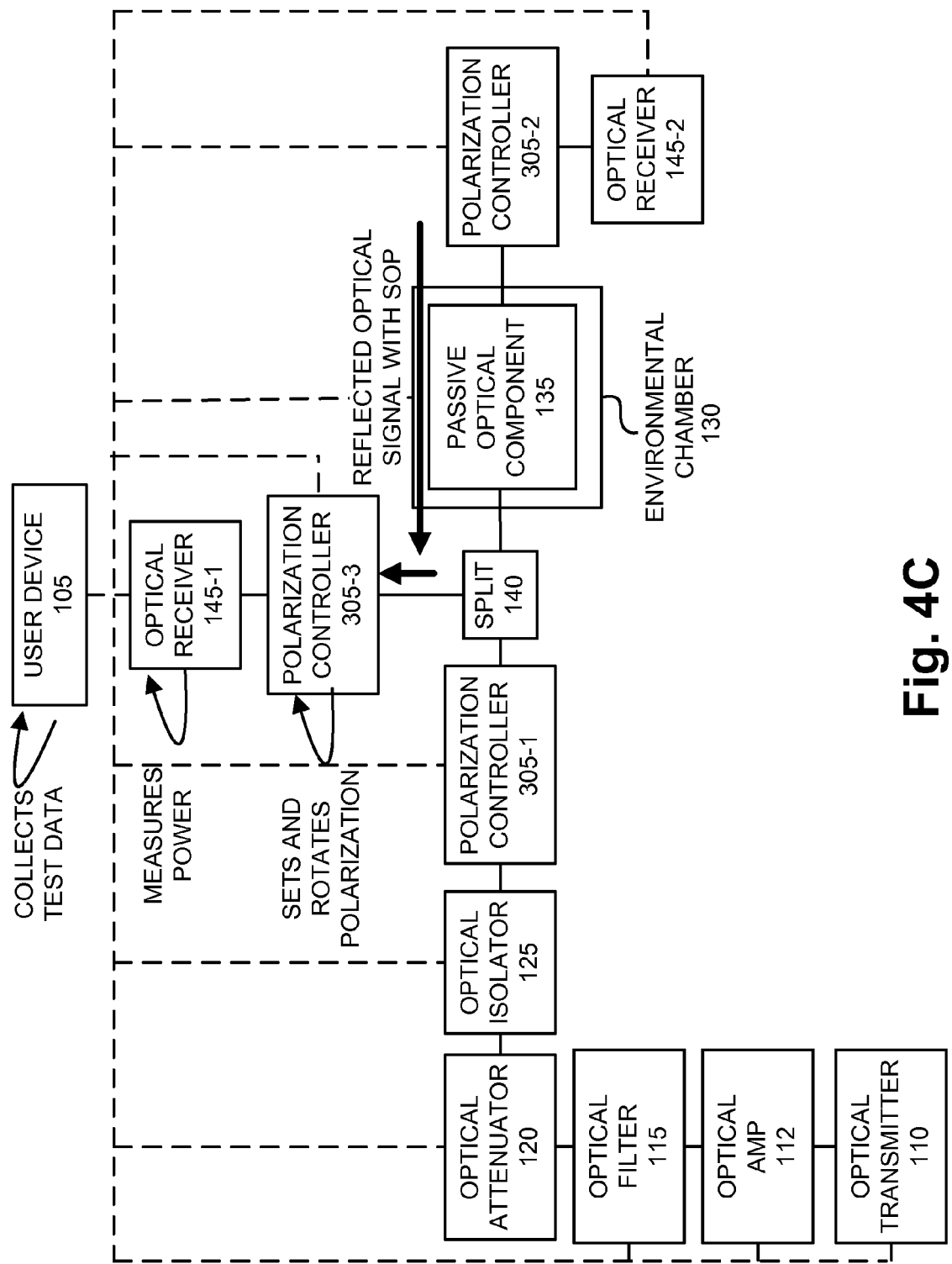

FIGS. 4A-4C are diagrams illustrating an exemplary process in which test system 300 is used to perform measurements of wavelength-dependent polarization dependent losses in relation to a device under test.

Referring to FIG. 4A, a user inputs via user device 105 various settings pertaining to the test. For example, similar to that previously described in FIGS. 2A-2C, the user is provided with a user interface to select global parameters pertaining to the test, enter and/or select information pertaining to the device under test and configure other components of test system 300. According to this exemplary process, the user also configures polarization controllers 305. For example, the user configures one or multiple polarization states to be created by polarization controller 305-1. Additionally, polarization controllers 305-2 and 305-3 are configured to align with those states of polarization. Additionally, as described further below, polarization controllers 305-2 and 305-3 incrementally rotate the state of polarization (e.g., rotate the state of polarization, in small steps, for a total of 360 degrees).

Referring to FIG. 4B, assume the user begins the test and test system 300 operates based on the user settings. For example, optical transmitter 110 transmits an optical signal of a particular wavelength and power that propagates to polarization controller 305-1. Polarization controller 305-1 creates a state of polarization of the optical signal. The optical signal having a state of polarization propagates to optical receiver 145-2 via passive optical component 135. As further illustrated, polarization controller 305-2 sets a state of polarization of the input optical signal to an initial starting point (e.g., an initial alignment angle). The starting point may be set at any alignment angle (e.g., by the user). Thereafter, polarization controller 305-2 incrementally rotates the state of polarization from the starting point. For example, polarization controller 305-2 rotates the state of polarization, in a step-wise fashion, for a total of 360 degrees. During this time, optical receiver 145-2 is measuring power of the received optical signal. The test data indicating the rotated state of polarization and the received optical power is provided to user device 105. User device 105 collects and stores the test data.

Referring to FIG. 4C, splitter 140 provides an optical path for a reflected optical signal to polarization controller 305-3. Polarization controller 305-3 performs a process similar to that previously described with respect to polarization controller 305-2. For example, polarization controller 305-3 sets a state of polarization of the reflected optical signal to an initial starting point. Thereafter, polarization controller 305-3 rotates the state of polarization, in a step-wise fashion, for a total of 360 degrees. During this time, optical receiver 145-1 measures the power of the received, reflected optical signal. The test data indicating the rotated state of polarization and the received optical power is provided to user device 105. User device 105 collects and stores the test data.

Figure 4D:
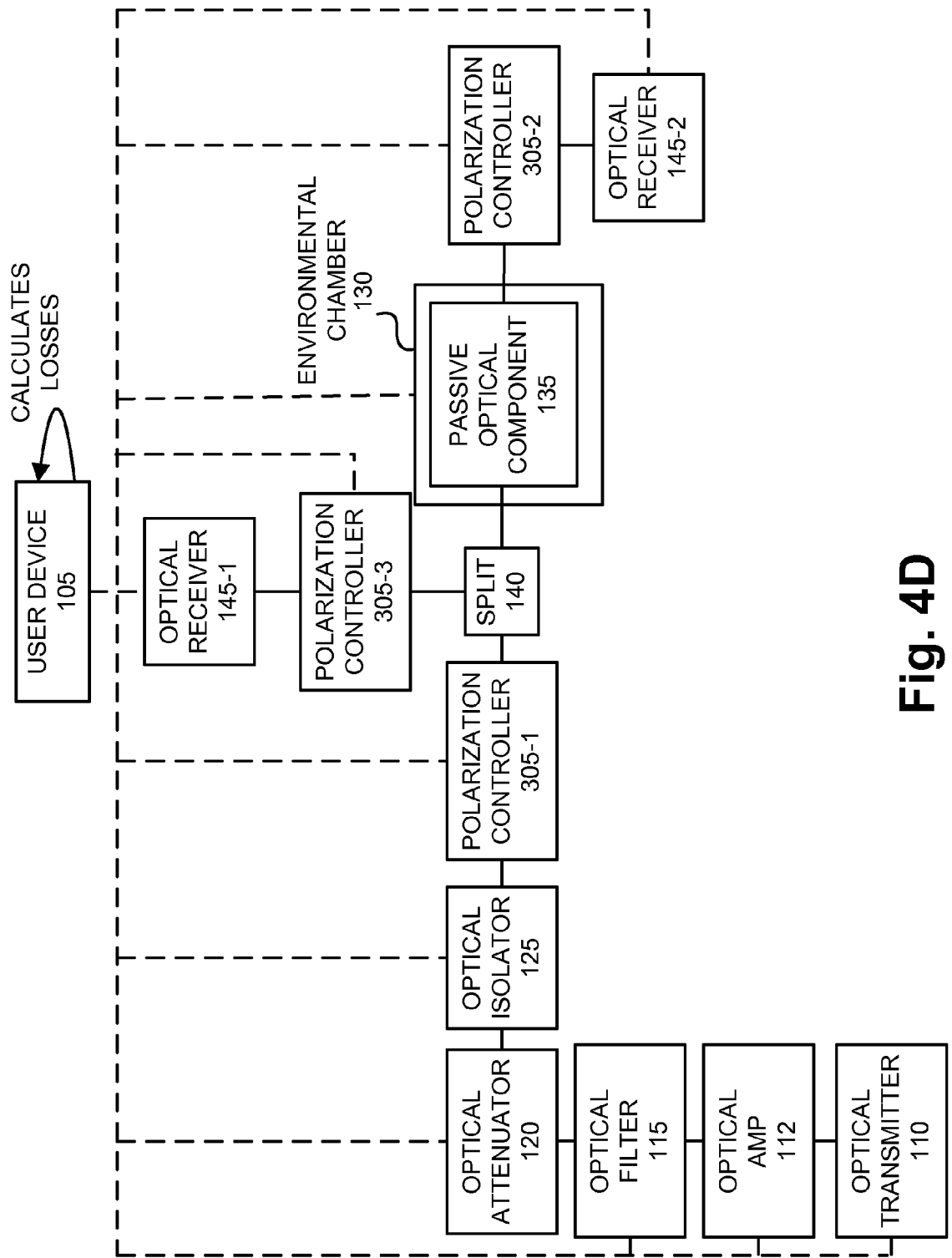

Referring to FIG. 4D, user device 105 calculates wavelength-dependent polarization dependent losses based on the test data. User device 105 includes an algorithm to calculate wavelength-dependent polarization dependent loss. For example, user device 105 selects maximum and minimum power values pertaining to the optical signal. User device 105 also selects maximum and minimum power values pertaining to the reflected optical signal. User device 105 calculates a wavelength-dependent polarization dependent loss based on the maximum and minimum power values. User device 105 may also generate a plot pertaining to the power values received.

The process described and illustrated in FIGS. 4A-4D continues across all bands until the test is completed. User device 105 and other components of test system 300 may operate according to feedback loops and/or test configuration information.

According to another embodiment, polarization controller 305-1 is configured to scramble the state of polarization. Polarization controllers 305-2 and 305-3 include polarization analyzers that trace the polarization state. A value for polarization mode dispersion is calculated. For example, an average value for the statistical polarization mode dispersion may be measured.

Figure 5A:
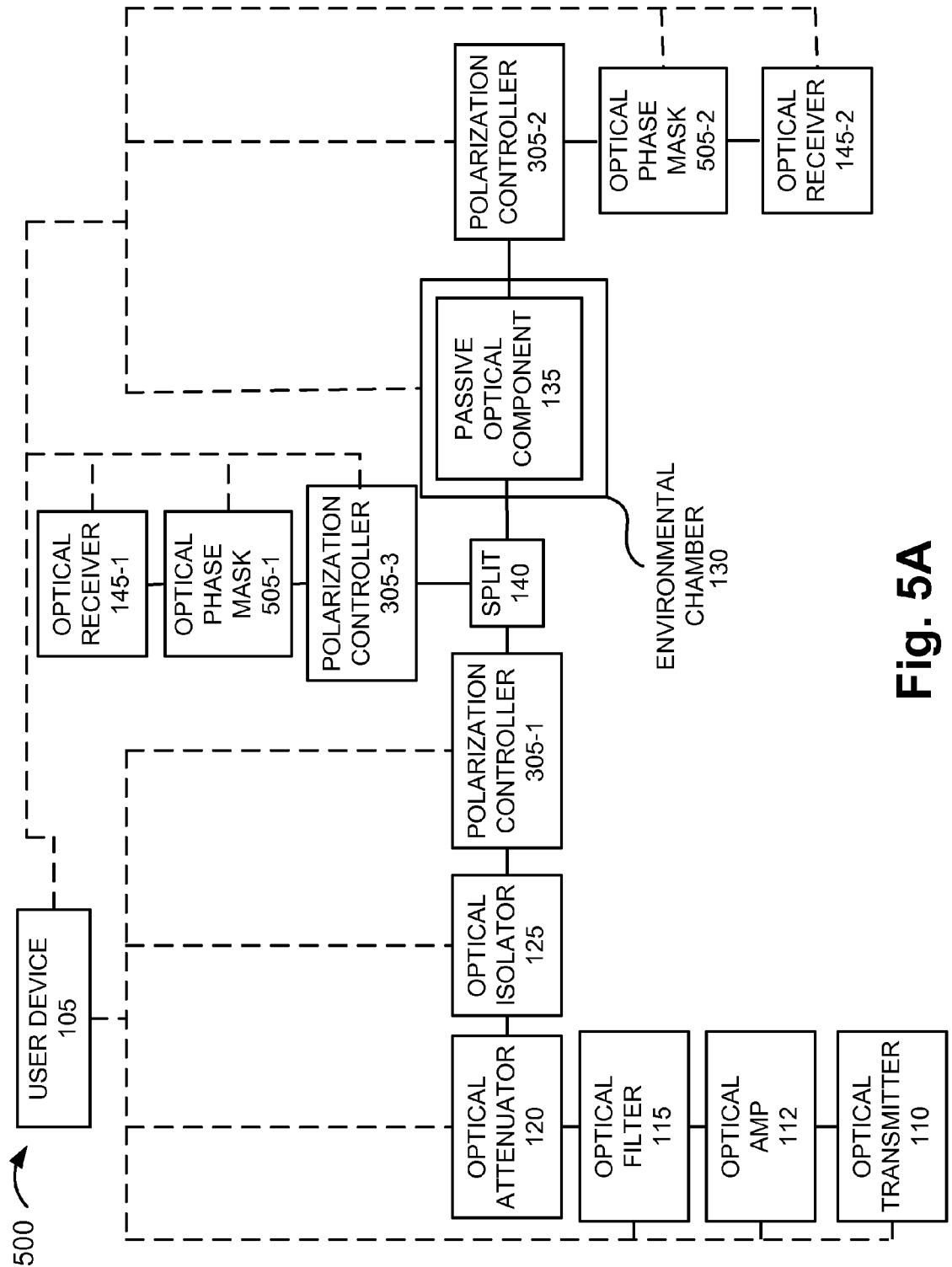
FIG. 5A is a diagram illustrating yet another exemplary embodiment of a test system capable of testing a device under test.

FIG. 5A is a diagram illustrating an exemplary embodiment of a test system 500 to test one or multiple passive optical components. For example, test system 500 is capable of testing wavelength-dependent multi-path interference (MPI) of a device under test, such as a passive optical component, across all bands. As illustrated, test system 500 includes the components of test system 300. In addition, test system 500 includes an optical phase mask 505-1 and 505-2 (also referred to individually as optical phase mask 505 or collectively as optical phase masks 505).

The number of components and the configuration of test system 500 are exemplary. According to other embodiments, test system 500 may include additional components, fewer components, different components, and/or differently arranged components, than those illustrated in FIG. 5A.

According to other embodiments, a single component depicted in FIG. 5A may be implemented as multiple components or multiple components depicted in FIG. 5A may be implemented as a single component. Additionally, test system 500 may be implemented having a different order of components along an optical signal path than the order of components illustrated in FIG. 5A.

The connections between the components of test system 500 are exemplary. A connection between components includes an optical fiber (e.g., fiber optic patch cable). According to an exemplary implementation, the optical fiber is a single-mode fiber (e.g. ITU-T G.652.D standard, etc.). According to an exemplary embodiment, user device 105 is communicatively coupled to other components of test system 500, as indicated by the dashed lines.

Optical phase mask 505 includes a component capable of tuning to a mode of an optical signal. When an optical signal is injected into and propagates through a transport system (e.g., test system 500), one or multiple degenerative components of the optical signal may be created due to, for example, boundary conditions. For example, the degenerative components may include two orthogonal modes that are linearly independent, but of the same wavelength. Optical phase mask 505 filters out a mode of an optical signal while permitting another mode of the optical signal to pass. For example, optical phase mask 505 filters out the fundamental mode LP (00), and accepts the first order mode of LP (01), in which each mode has two degenerative polarization states at the specific wavelength.

Figure 5B:
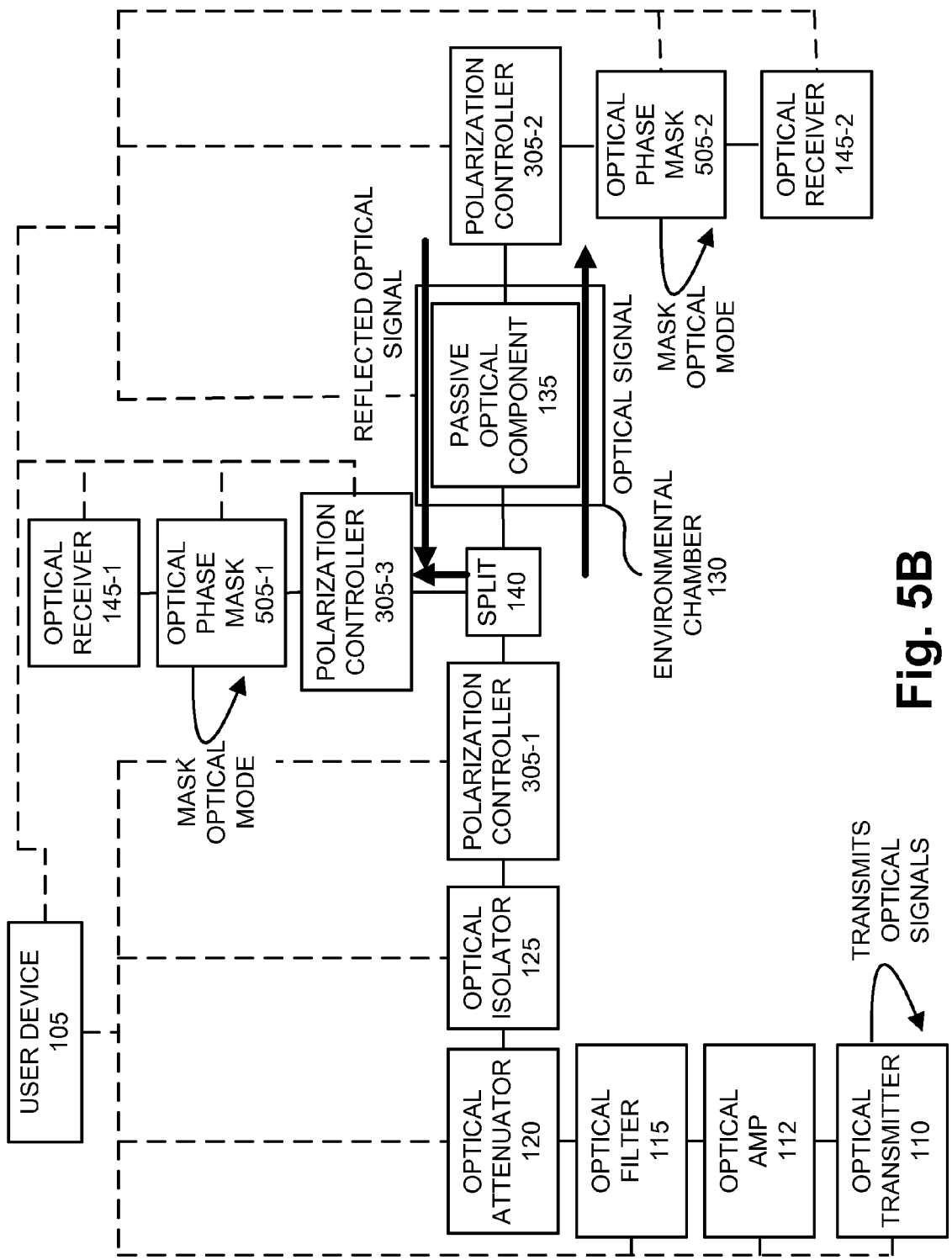
FIG. 5B is a diagram illustrating yet another exemplary process in which the test system is used to perform measurements of wavelength-dependent multi-path interferences in relation to the device under test.

According to an exemplary embodiment, a test system (e.g., test system 500) is capable of testing wavelength-dependent multi-path interference. Referring to FIG. 5B, test system 500 is capable of measuring wavelength-dependent multi-path interference. In a manner similar to that described above, a user inputs global settings, information and configurations pertaining to components of test system 500, including optical phase masks 145. For example, the user configures a mode of an optical signal to be filtered out or a mode of the optical signal to pass through optical phase masks 505.

As an example, optical transmitter 110 transmits an optical signal of a single mode (e.g., a fundamental mode). Polarization controllers 305 and optical receivers 145 perform a process similar to that described above, in which polarization controllers 305-2 and 305-3 incrementally rotate the state of polarization and optical receivers 145 collect the power values. During this time, optical phase masks 505 may be shut-off or configured to allow all modes to pass. The test data is provided to user device 105. User device 105 selects the state of polarization that yields the maximum power. For example, such a configuration may yield the maximum interference. Polarization controllers 305-3 are then set to the alignment angle that yields the maximum power. Additionally, optical phase masks 505-1 and 505-2 are set to allow a particular mode to pass (e.g., a fundamental mode) and filter out all other modes (e.g., $1^{st}$ order mode, etc.).

Subsequently, optical transmitter 110 transmits an optical signal of a single mode. Optical receivers 145 measure the power of the transmitted and reflected optical signals. Optical phase masks 505-1 and 505-2 are set to allow another mode of pass (e.g., $1^{st}$ order mode) and filter out all other modes (e.g., fundamental mode, etc.). Optical receivers 145 measure the power of the transmitted and reflected optical signals. This process may continue in which optical phase masks 505 are set to allow a particular mode to pass. By measuring the power of the fundamental and higher-order modes, user device 105 may calculate the mode coupling ratio or a total multi-path interference estimate for the device under test.

Multi-path interference includes both mode-dependent and polarization-dependent factors.

The process continues across all bands until the test is completed. User device 105 and other components of test system 500 may operate according to feedback loops and/or test configuration information.

FIG. 6 is a diagram illustrating exemplary components of a device 600 that may correspond to one or more of the devices of the test systems depicted in FIGS. 1, 3, and 5A. As illustrated, according to an exemplary embodiment, device 600 includes a processor 605, memory/storage 610 storing software 615, a communication interface 620, an input 625, and an output 630. According to other embodiments, device 600 may include fewer components, additional components, different components, and/or a different arrangement of components than those illustrated in FIG. 6 and described herein.

Processor 605 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (e.g., one or multiple cores), microcontrollers, and/or some other type of component that interprets and/or executes instructions and/or data. Processor 605 may be implemented as hardware (e.g., a microprocessor, etc.), a combination of hardware and software (e.g., a SoC, an ASIC, etc.), may include one or multiple memories (e.g., memory/storage 610), etc.

Processor 605 may control the overall operation or a portion of operation(s) performed by device 600. Processor 605 may perform one or multiple operations based on an operating system and/or various applications or programs (e.g., software 615). Processor 605 may access instructions from memory/storage 610, from other components of device 600, and/or from a source external to device 600 (e.g., a network, another device, etc.).

Memory/storage 610 includes one or multiple memories and/or one or multiple other types of storage mediums. For example, memory/storage 610 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 610 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 610 may include drives for reading from and writing to the storage medium.

Memory/storage 610 may be external to and/or removable from device 600, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 610 may store data, software, and/or instructions related to the operation of device 600.

Software 615 includes an application or a program that provides a function and/or a process. Software 615 may include firmware. Communication interface 620 permits device 600 to communicate with other devices, networks, and/or systems. For example, with reference to user device 105, communication interface 620 permits user device 105 to communicate with a component of test system 100, test system 300, and test system 500. By way of further example, communication interface 620 may include a communication interface to communicate with optical transmitter 110, etc. Communication interface 620 may include a wireless interface and/or a wired interface. Communication interface 620 includes a transmitter, a receiver, and/or a transceiver.

Input 625 provides an input into device 600. For example, input 625 may include a keyboard, a mouse, a display, a touchscreen, a touchless screen, a button, a switch, an input port, speech recognition logic, and/or some other type of visual, auditory, tactile, etc., input component. Output 630 provides an output from device 600. For example, output 630 may include a speaker, a display, a touchscreen, a touchless screen, a light, an output port, and/or some other type of visual, auditory, tactile, etc., output component.

Device 600 may perform processes and/or functions, as described herein, in response to processor 605 executing software 615 stored by memory/storage 610. By way of example, the instructions may be read into memory/storage 610 from another memory/storage 610 or from another device via communication interface 620. The instructions stored by memory/storage 610 may cause processor 605 to perform one or more processes described herein. Alternatively, for example, according to other implementations, device 600 may perform one or more processes described herein based on the execution of hardware (processor 605, etc.), the execution of firmware with hardware, or the execution of software and firmware with hardware.

Based on the above-mentioned components, user device 105 may store one or multiple databases or data structures that store(s) test data and test results (e.g., calculated wavelength-dependent losses, interferences, etc.). User device 105 also includes logic to calculate wavelength-dependent losses and multi-path interferences based on test data.

Figure 7A:
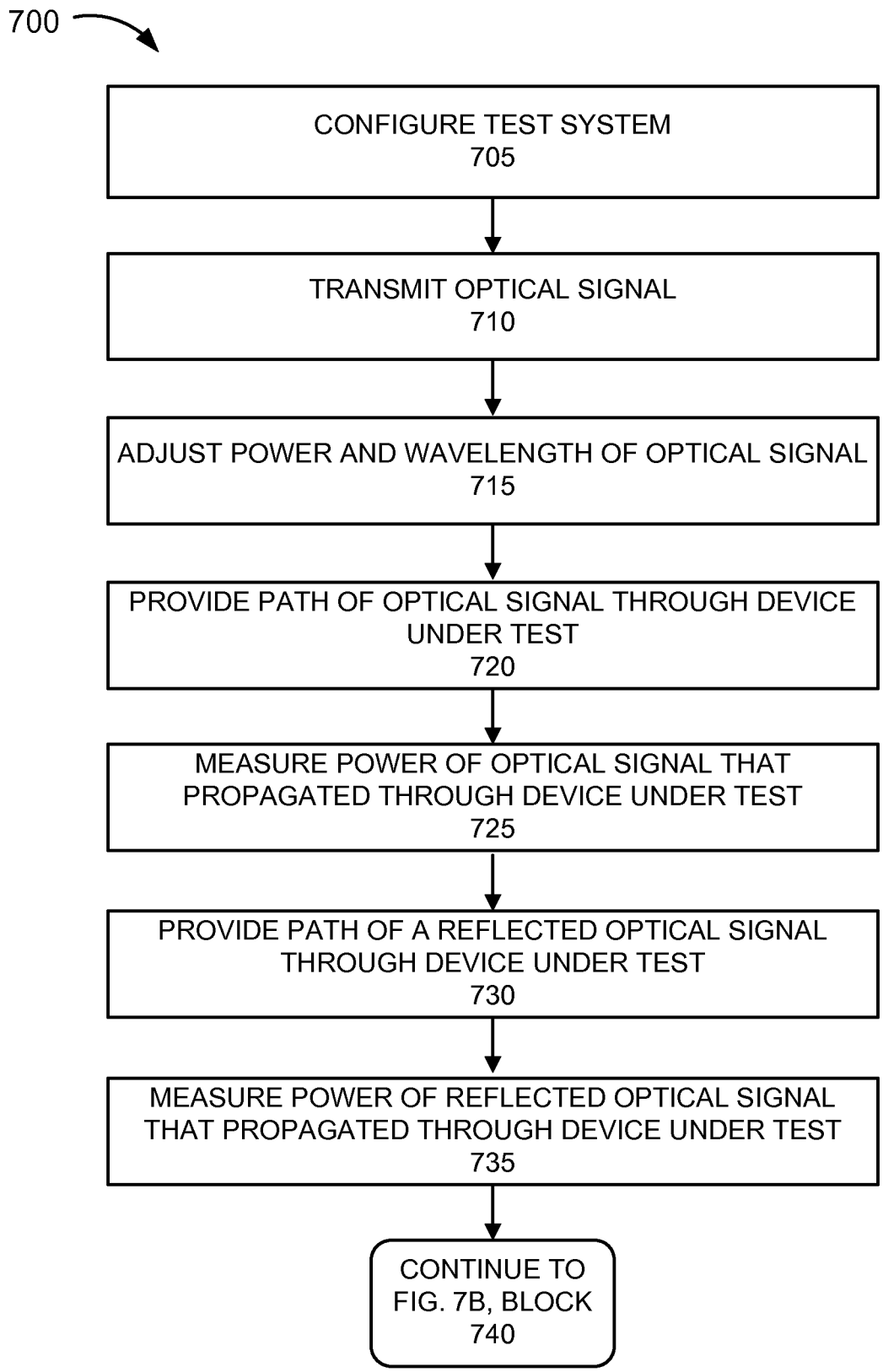
FIGS. 7A and 7B are flow diagrams illustrating an exemplary process for measuring and calculating wavelength-dependent losses in relation to a device under test.
Figure 7B:
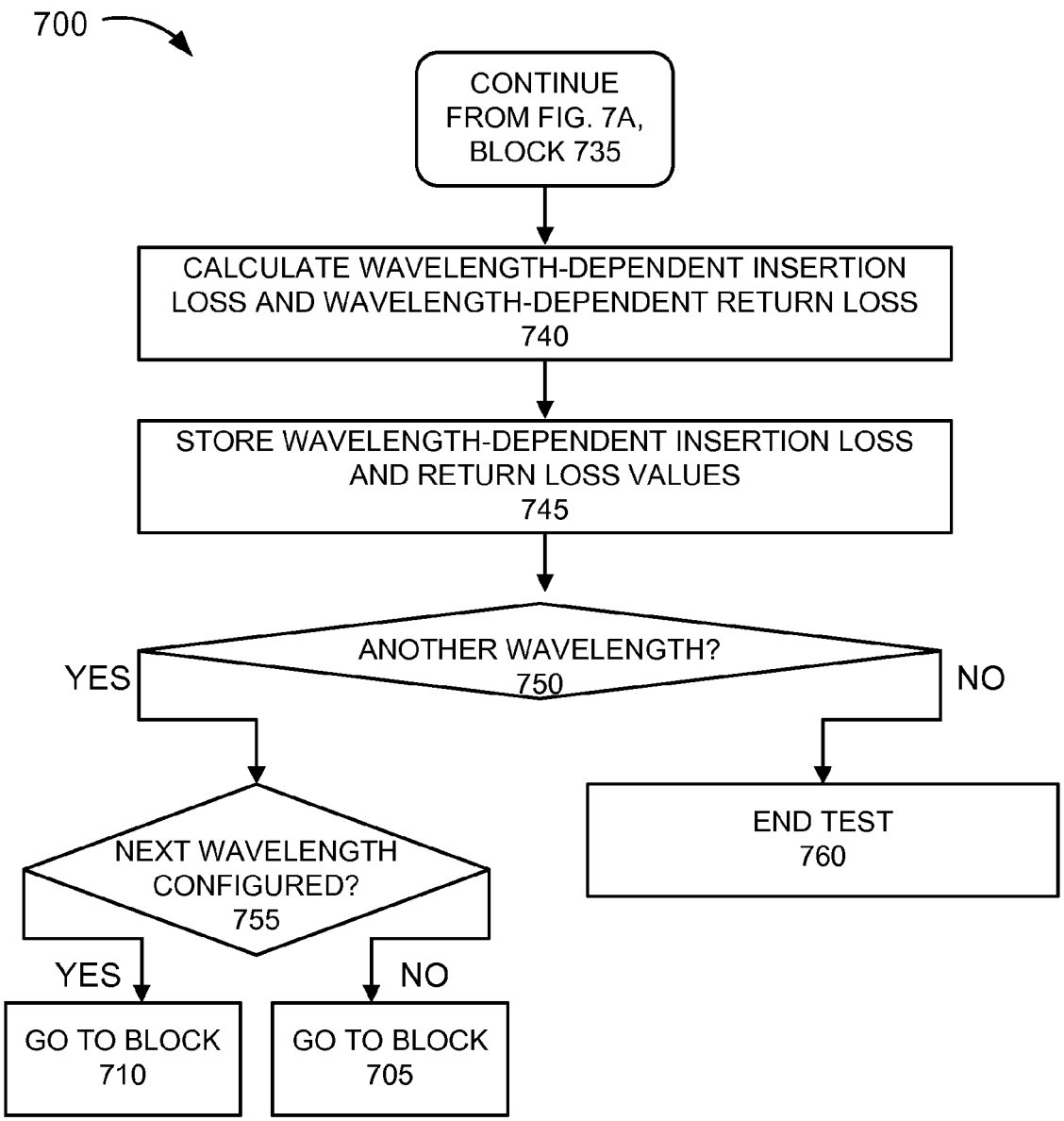

FIGS. 7A and 7B are flow diagrams illustrating an exemplary process 700 for measuring and calculating wavelength-dependent loss in relation to a device under test. For example, process 700 provides for the measuring and calculating of wavelength-dependent insertion loss and wavelength-dependent return loss. According to an exemplary embodiment, the device under test includes one or multiple passive optical components, which may be configured in a cascaded and/or parallel manner. Process 700 is performed by test system 100. Process 700 may be performed in relation to bands "O" through "U."

Referring to FIG. 7A, process 700 begins with configuring the test system (block 705). For example, as previously described, a user inputs global test parameters (e.g., duration of a test, equipment used, etc.), configuration parameters pertaining to components of test system 100 (e.g., optical transmitter 110, optical amplifier 112, optical filter 115, etc.), and information pertaining to the device under test (e.g., passive optical component(s), configuration of passive optical component(s), etc.).

In block 710, an optical signal is transmitted. For example, as previously described, optical transmitter 110 is configured to transmit an optical signal having particular wavelength and power values.

In block 715, the power and the wavelength are adjusted. For example, as previously described, optical amplifier 112 and optical attenuator 120 control the power level of the optical signal. Additionally, optical filter 115 manages the wavelength of the optical signal.

In block 720, an optical path for the optical signal through the device under test is provided. For example, as previously described, test system 100 includes a splitter 140 and a single mode optical fiber to provide an optical path through passive optical component 135.

In block 725, the power of the optical signal that propagated through the device under test is measured. For example, as previously described, optical receiver 145-2 measures the power of the optical signal that propagated through passive optical component 135.

In block 730, an optical path for a reflected optical signal through the device under test is provided. For example, as previously described, test system 100 permits a reflected optical signal to propagate through passive optical component 135.

In block 735, the power of the reflected optical signal that propagated through the device under test is measured. For example, as previously described, optical receiver 145-1 measures the power of the reflected optical signal that propagated through passive optical component 135.

Referring to FIG. 7B, block 740, wavelength-dependent insertion loss and wavelength dependent return loss is calculated. For example, as previously described, user device 105 calculates wavelength-dependent insertion loss and return losses based on power values received by optical receivers 145.

In block 745, wavelength-dependent insertion loss and return loss values are stored. For example, as previously described, user device 105 stores wavelength-dependent insertion loss and return loss values in a database or a data structure.

In block 750, it is determined whether another wavelength is to be tested. For example, user device 105 identifies whether another wavelength is to be tested based on configuration data.

If it is determined that another wavelength is to be tested (block 750—YES), then it is determined whether the next wavelength is already configured (block 755). For example, user device 105 determines whether another optical transmitter 110 and/or other component of test system 100 needs to be swapped-out based on the capabilities of the component (e.g., global parameters).

If it is determined that the next wavelength is already configured (block 755—YES), then process 700 continues to block 710. If it is determined that the next wavelength is not already configured (block 755—NO), then process continues to block 705.

Referring back to block 750, if it is determined that another wavelength is not to be tested (block 750—NO), the process 700 ends (block 760).

Although FIGS. 7A and 7B illustrate an exemplary process 700, according to other implementations, process 700 may include additional operations, fewer operations, and/or different operations than those illustrated and described herein.

Figure 8A:
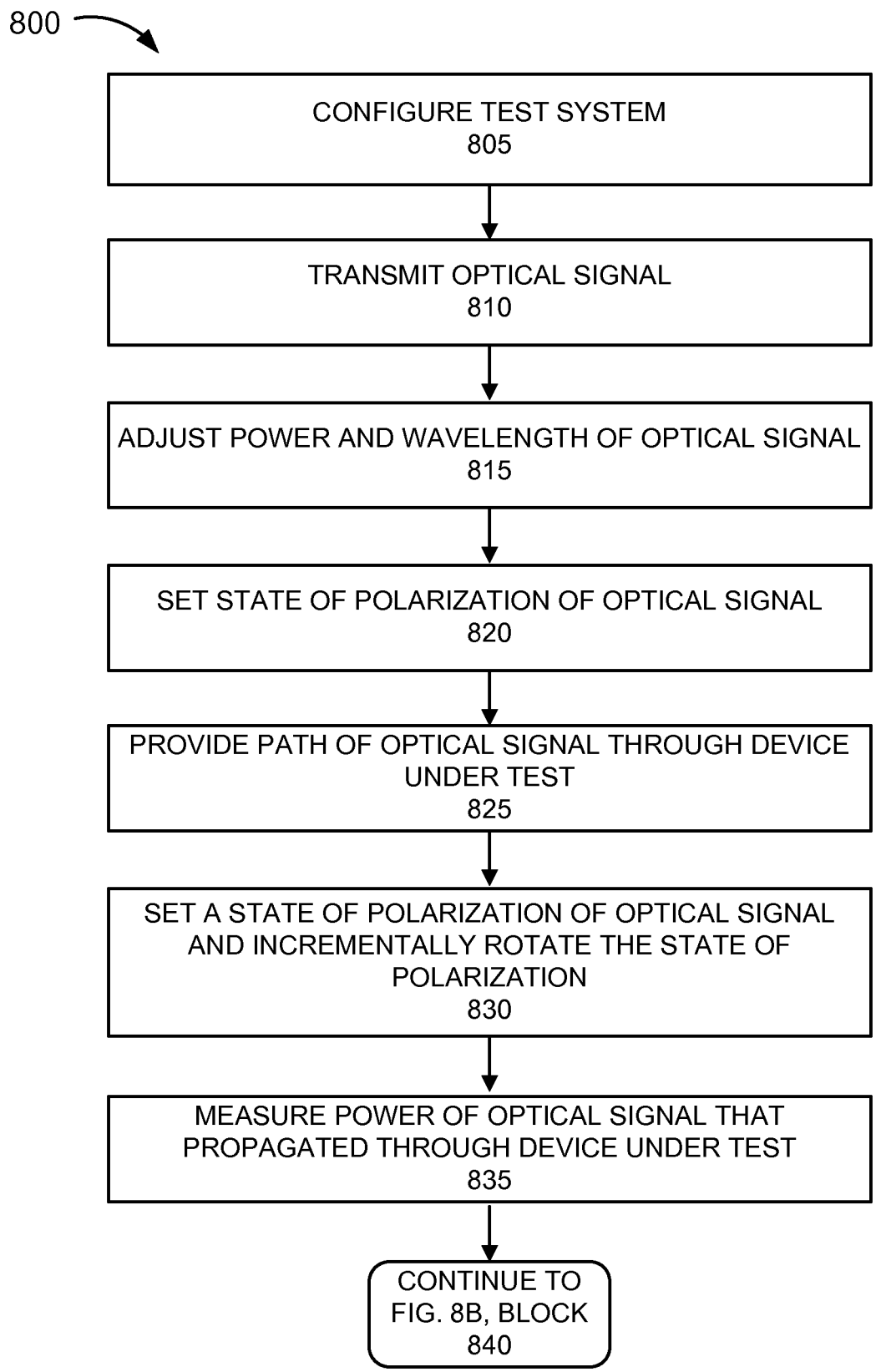
FIGS. 8A-8C are flow diagrams illustrating another exemplary process for measuring and calculating wavelength-dependent polarization dependent losses in relation to a device under test.
Figure 8B:
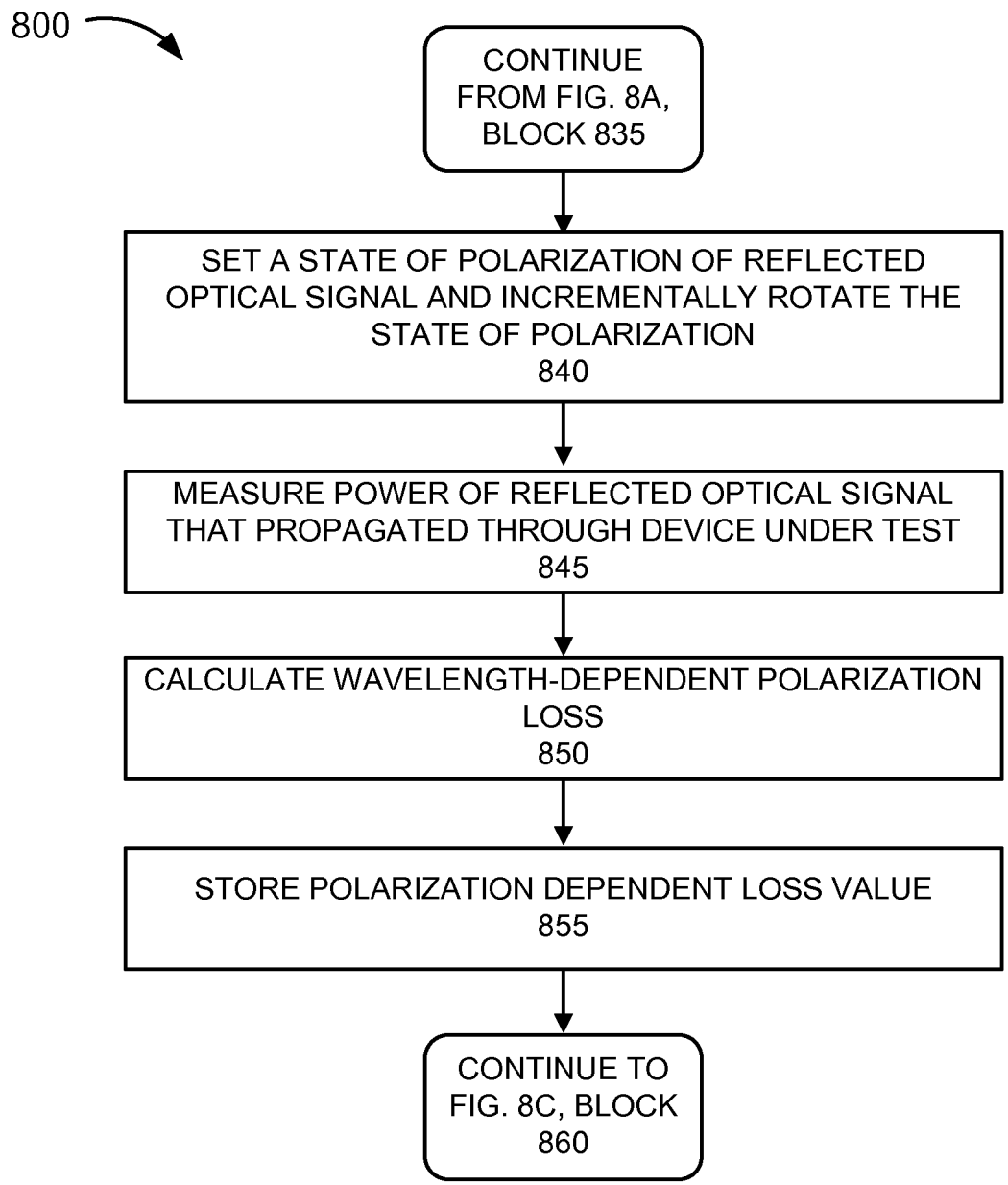
Figure 8C:
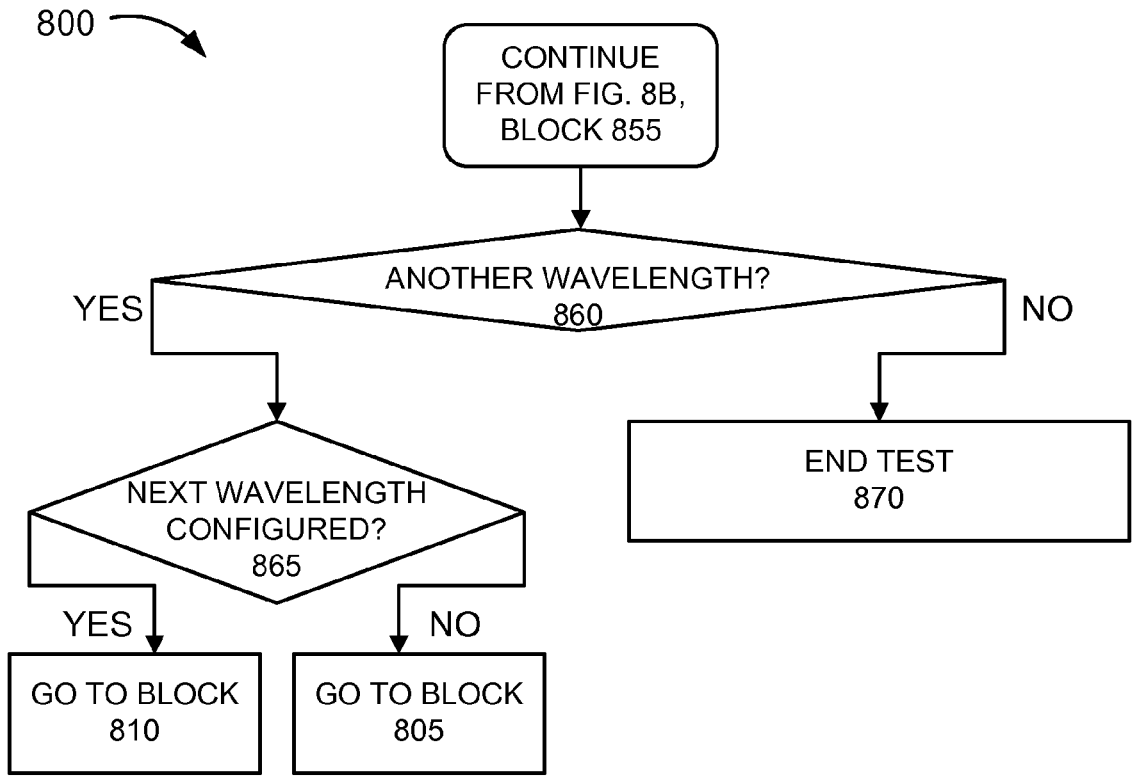

FIGS. 8A-8C are flow diagrams illustrating an exemplary process 800 for measuring and calculating wavelength-dependent polarization dependent loss in relation to a device under test. For example, process 800 provides for the measuring and calculating of wavelength-dependent insertion loss, wavelength-dependent return loss, and wavelength dependent polarization loss. According to an exemplary embodiment, the device under test includes one or multiple passive optical components, which may be configured in a cascaded and/or parallel manner. Process 800 is performed by test system 300. Process 800 may be performed in relation to bands "O" through "U."

Description of steps previously described in process 700 is omitted. Referring to FIG. 8A, block 820, the state of polarization of the optical signal is set. For example, as previously described, polarization controller 305-1 sets the state of polarization of the optical signal based on configuration information. In block 830, a state of polarization is set and an incremental rotation of the state of polarization is performed. For example, as previously described, polarization controller 305-2 sets an initial state of polarization of the optical signal that propagated through the device under test. The starting point of polarization may be any state. Polarization controller 305-2 incrementally rotates the state of polarization (e.g., 360 degrees, in a step-wise fashion). Referring to FIG. 8B, block 840, a state of polarization is set and an incremental rotation of the state of polarization is performed. For example, as previously described, polarization controller 305-3 sets an initial state of polarization of the reflected optical signal. Polarization controller 305-3 incrementally rotates the state of polarization (e.g., 360 degrees, in a step-wise fashion). In block 850, wavelength-dependent polarization loss is calculated. For example, as previously described, user device 105 calculates the wavelength-dependent polarization loss for the optical signal and the reflected optical signal. In block 855, a wavelength-dependent polarization dependent loss value is stored. For example, user device 105 stores wavelength-dependent polarization dependent loss values pertaining to the optical signal and the reflected optical signal.

Figure 9A:
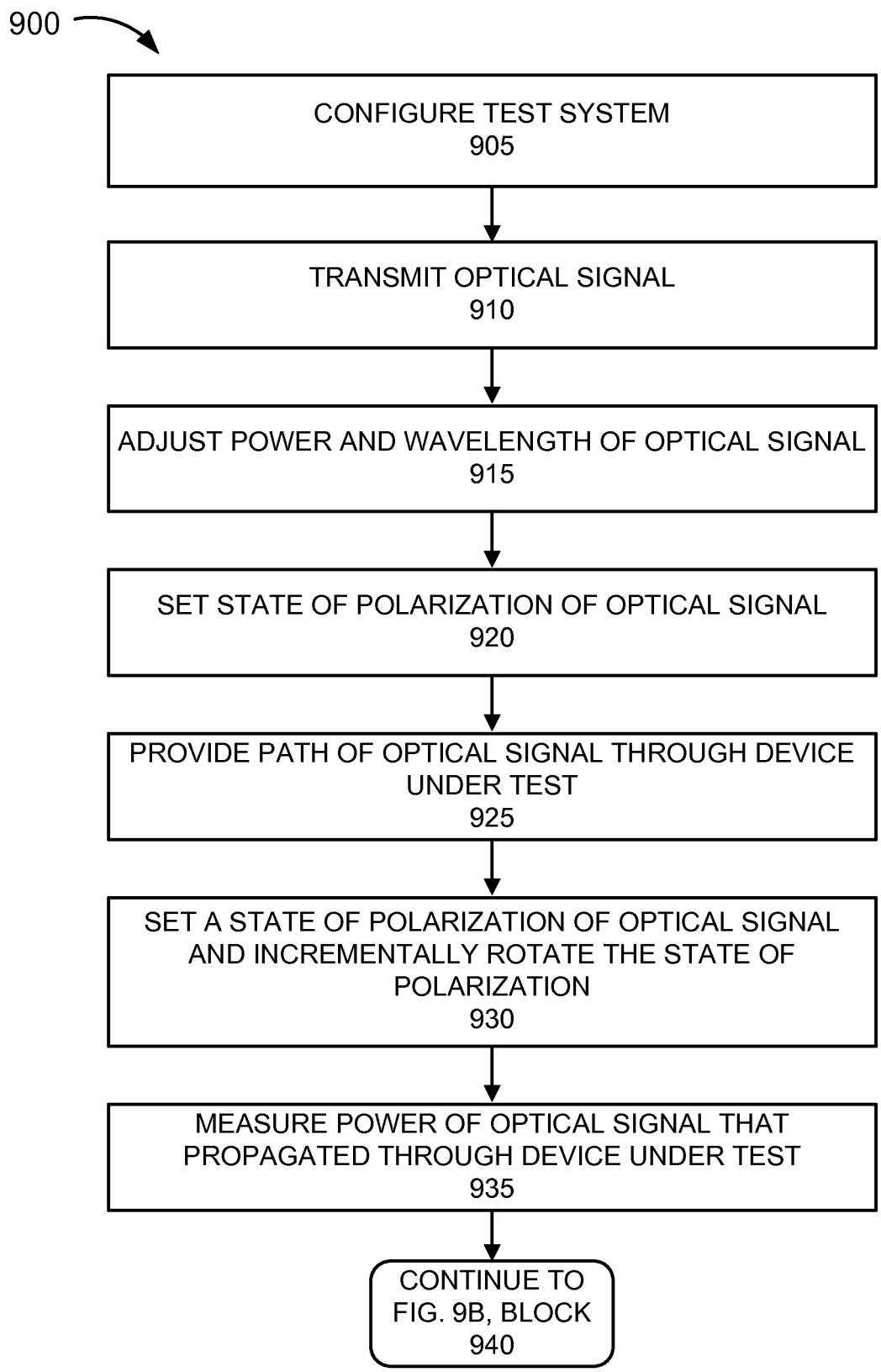
FIGS. 9A-9C are flow diagrams illustrating an exemplary process for measuring and calculating wavelength-dependent multi-path interferences in relation to a device under test.
Figure 9B:
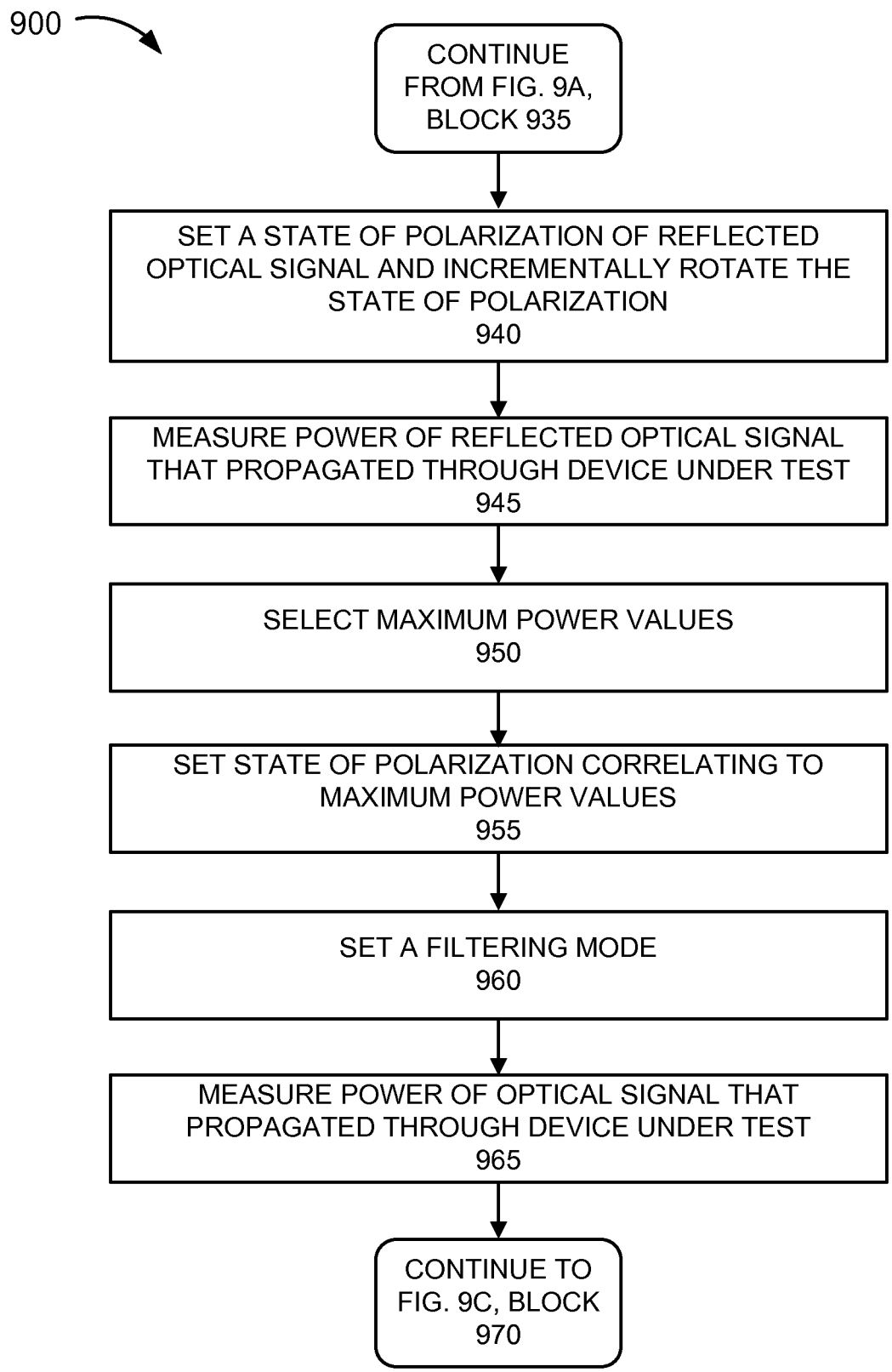
Figure 9C:
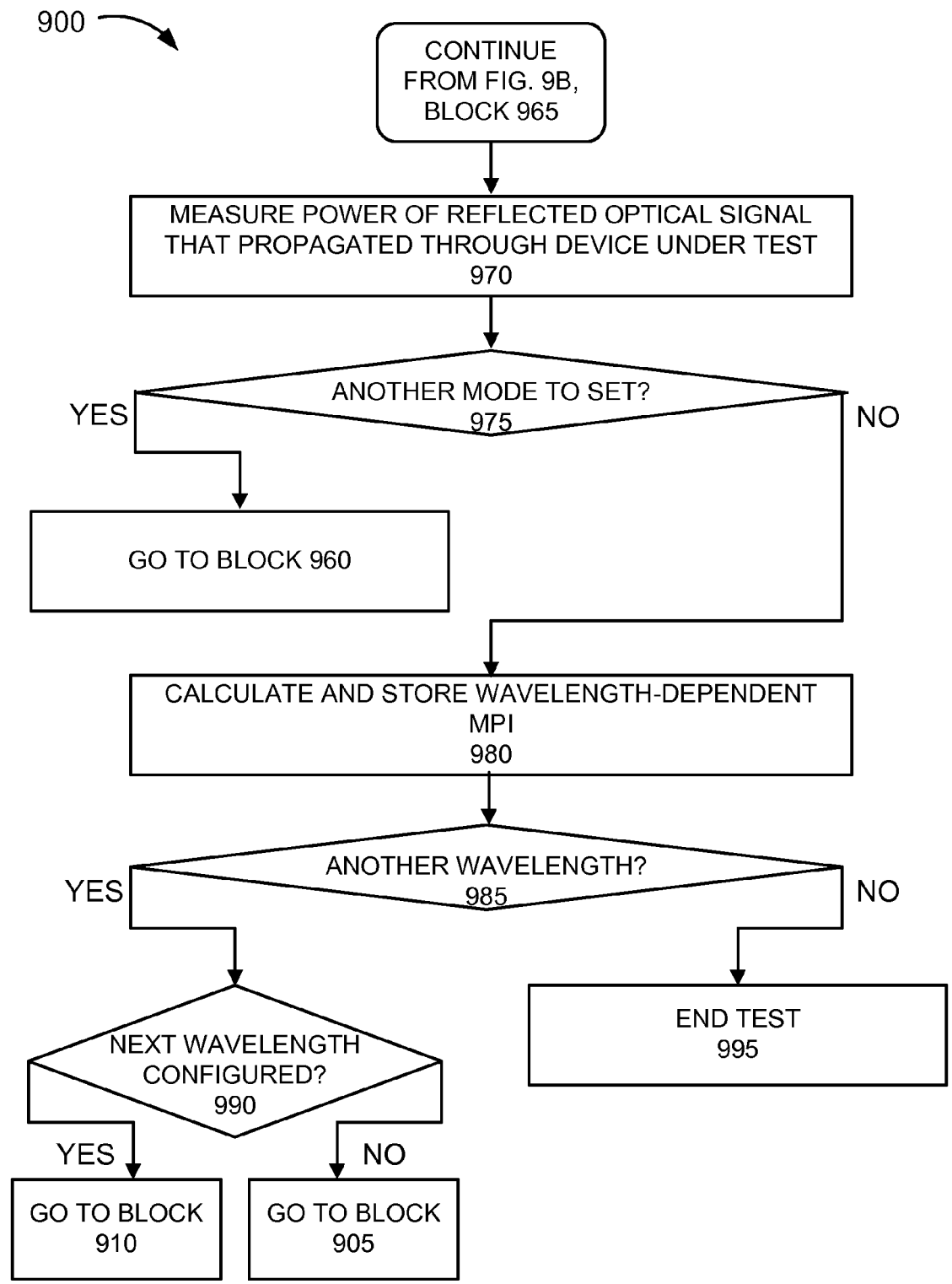

FIGS. 9A-9C are flow diagrams illustrating an exemplary process 900 for measuring and calculating wavelength-dependent interference in relation to a device under test. For example, process 900 provides for the measuring and calculating of wavelength-dependent insertion loss, wavelength-dependent return loss, wavelength dependent polarization loss, and wavelength dependent multi-path interference. According to an exemplary embodiment, the device under test includes one or multiple passive optical components, which may be configured in a cascaded and/or parallel manner. Process 900 is performed by test system 500. Process 900 may be performed in relation to bands "O" through "U."

Descriptions of steps previously described in processes 700 and 800 are omitted. Referring to FIG. 9B, block 950, user device 105 identifies the maximum power values included in the test data that was collected while polarization controllers 305-2 and 305-3 rotated the state of polarizations. In block 955, user device 105 sets polarization controllers 305-2 and 305-3 to a configuration that yielded the maximum power values. In block 960, optical phase masks 505-1 and 505-2 are also set to filter a mode of the optical signal. In block 965, the power of the optical signal that propagated through the device under test is measured by optical receiver 145-2. Referring to FIG. 9C, in block 970, the power of the reflected optical signal that propagated through the device under test is measured by optical receiver 145-1.

In block 975, it is determined whether another mode is to be set. For example, optical phase masks 505 may be set to filter out the fundamental mode and high order mode(s). If it is determined that another mode is to be set (block 975—YES), then process 900 continues to block 960. For example, the tester may wish to test the fundamental mode and the $1^{st}$ order mode. Alternatively, for example, the tester may wish to test the fundamental mode and a series of high order modes (e.g., $1^{st}$ order mode, $2^{nd}$ order mode, etc.). If it is determined that another mode is not to be set (block 975—NO), then a wavelength-dependent multi-path interference is calculated and stored. For example, as previously described, user device 105 calculates one or multiple, estimated multi-path interference values (e.g., an estimated MPI value for the $1^{st}$ order mode, an estimated MPI value for the $2^{nd}$ order mode, a total estimated MPI value (e.g., that includes multiple high order modes, such as $1^{st}$ order mode, $2^{nd}$ order mode, etc.), etc.) based on the power values associated with the set modes.

The foregoing description of embodiments provides illustration, but is not intended to be exhaustive or to limit the embodiments to the precise form disclosed. Accordingly, modifications to the embodiments described herein may be possible. For example, a test system may be configured to measure and calculate wavelength-dependent insertion loss, wavelength-dependent return loss, wavelength-dependent polarization, and/or wavelength-dependent multi-path interference.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks have been described with regard to the processes illustrated in FIGS. 7A, 7B, 8A-8C, and 9A-9C, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software, firmware, and/or hardware. For example, a process or a function may be implemented as "logic" or as a "component." This logic or this component may include hardware (e.g., processor 605, etc.), a combination of hardware and software (e.g., software 615), a combination of hardware and firmware, or a combination of hardware, firmware, and software. The embodiments have been described without reference to the specific software code since software can be designed to implement the embodiments based on the description herein.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

No element, act, or instruction described in the present application should be construed as critical or essential to the embodiments described herein unless explicitly described as such.

What is claimed is:

1. A method comprising:
    setting a state of polarization of an optical signal;
    setting a first initial state of polarization of the optical signal that propagates through a device under test;
    setting a second initial state of polarization of a reflected portion of the optical signal that propagates through the device under test;
    transmitting the optical signal, via a test system, into the device under test comprising one or more passive optical components;
    measuring a power of the optical signal that propagated through the device under test;
    calculating a wavelength-dependent insertion loss based on the measured power of the optical signal;
    measuring another power of the reflected portion of the optical signal that propagated through the device under test; and
    calculating a wavelength-dependent return loss based on the other measured power of the reflected portion of the optical signal.

2. The method of claim 1, wherein the transmitting comprises:
    transmitting the optical signal for an O-band through a U-band.

3. The method of claim 1,
    wherein test components of the test system are optically connected to each other and the device under test using a single mode optical fiber.

4. The method of claim 1, further comprising:
    rotating the state of polarization, from the initial state of polarization to an end state of polarization, of the optical signal;
    rotating the state of polarization, from the initial state of polarization to an end state of polarization, of the reflected portion of the optical signal;
    measuring power values, of the optical signal and the reflected portion of the optical signal, during the rotating;
    selecting minimum and maximum power values associated with the optical signal and the reflected portion of the optical signal; and
    calculating a wavelength-dependent polarization loss based on the selected minimum and maximum power values.

5. The method of claim 1, further comprising:
    rotating the state of polarization, from the first initial state of polarization to an end state of polarization, of the optical signal;
    rotating the state of polarization, from the second initial state of polarization to an end state of polarization, of the reflected portion of the optical signal;
    measuring power values, of the optical signal and the reflected portion of the optical signal, during the rotating;
    selecting maximum power values associated with the optical signal and the reflected portion of the optical signal; and
    selecting a state of polarization that yields the maximum power values associated with the optical signal and the reflected portion of the optical signal.

6. The method of claim 5, further comprising:
    setting the state of polarization that yields a maximum power value associated with the optical signal;
    setting the state of polarization that yields a maximum power value associated with the reflected portion of the optical signal;
    setting a first mode to be filtered out of the optical signal;
    setting a second mode to be filtered out of the reflected portion of the optical signal;
    filtering out the first mode from the optical signal that propagated through the device under test;
    filtering out the second mode from the reflected portion of the optical signal that propagated through the device under test.

7. The method of claim 5, further comprising:
measuring power values, of the optical signal and the reflected portion of the optical signal, during the filtering out;
determining whether another mode is to be filtered out of the optical signal and the reflected portion of the optical signal; and
calculating a wavelength-dependent multi-path interference based on the measured power values obtained during the filtering out, in response to a determination that another mode is not to be filtered out of the optical signal and the reflected portion of the optical signal, wherein the test system includes a single-mode optical fiber.

8. The method of claim 1, wherein the test system includes an environmental chamber;
setting one or more environmental values pertaining to the environmental chamber; and
exposing the device under test to one or more environmental conditions in correspondence to the one or more environmental values.

9. A test system comprising:
a user device comprising:
a communication interface;
one or more memories that store instructions; and
one or more processors to execute the instructions to:
receive a selection of parameters directed to conducting a test of a device under test comprising one or more passive optical components;
cause, via the communication interface, other test components of the test system to conduct the test based on the parameters, the other test components comprising:
an optical signal source capable of transmitting an optical signal, which has a wavelength between an O-band through a U-band, through the device under test;
an optical receiver comprising a power meter that is optically connected to, and upstream from, the device under test; and
another optical receiver comprising a power meter that is optically connected to, and downstream from, the device under test;
collect, via the communication interface, test data during the test from the optical receiver and the other optical receiver;
calculate, wavelength-dependent insertion loss and wavelength-dependent return loss; and
store wavelength-dependent insertion loss and wavelength-dependent return loss values.

10. The test system of claim 9, wherein, when causing, the one or more processors further execute the instructions to:
cause the optical signal source to transmit a series of optical signals, each having a unique wavelength between the O-band through the U-band, through the device under test.

11. The test system of claim 9, wherein the other test components further comprise:
a first polarization controller that is optically connected to, and downstream from, the device under test;
a second polarization controller that is optically connected to, and upstream from, the device under test; and
a third polarization controller that is optically connected to, and downstream from, the device under test
wherein, when causing, the one or more processors further execute the instructions to:
cause the first polarization controller to set a state of polarization of the optical signal;
cause the second polarization controller to rotate the state of polarization of the optical signal; and
cause the third polarization controller to rotate the state of polarization of a reflected portion of the optical signal.

12. The test system of claim 11, wherein, when calculating, the one or more processors further execute the instructions to:
calculate a wavelength-dependent polarization loss.

13. The test system of claim of 9, wherein the other test components further comprising:
an optical phase mask that is optically connected to, and downstream from, the device under test; and
another optical phase mask that is optically connected to, and upstream from, the device under test;
wherein, when causing, the one or more processors further execute the instructions to:
cause the optical phase mask to filter a mode of the optical signal; and
cause the other optical phase mask to filter a mode of a reflected portion of the optical signal.

14. The test system of claim 13, wherein, when calculating, the one or more processors further execute the instructions to:
calculate a wavelength-dependent multi-path interference based on a mode-filtered optical signal and a mode-filtered reflected portion of the optical signal.

15. The test system of claim 9, wherein the test components are optically connected to each other and the device under test using a single mode optical fiber.

16. The test system of claim 9, wherein the test components further comprise:
an optical splitter that is optically connected, upstream from, the device under test.

17. The test system of claim 9, wherein the test components further comprise:
an optical filter that is capable of filtering a wavelength associated with the optical signal.

18. A method comprising:
setting states of polarization of the optical signals;
transmitting a series of optical signals within a range of an O-band through a U-band, via a test system, into a device under test comprising one or more passive optical components;
rotating states of polarization of the optical signals that propagated through the device under test;
measuring powers of the optical signals that propagated through the device under test;
calculating wavelength-dependent insertion loss values based on the measured powers of the optical signals;
rotating states of polarization of reflected portions of the optical signals that propagated through the device under test;
measuring powers of the reflected portions of the optical signals that propagated through the device under test;
calculating wavelength-dependent return loss values based on the measured powers of the reflected portion of the optical signal; and
calculating wavelength-dependent polarization loss values.

19. The method of claim 18, further comprising:
setting initial states of polarization of the optical signals that propagate through the device under test; and
setting initial states of polarization of the reflected portions of the optical signals that propagate through the device under test.

20. The method of claim 18, further comprising:
setting a first mode to be filtered out of the optical signals;

setting a second mode to be filtered out of the reflected portion of the optical signals;
filtering out the first mode from the optical signals that propagated through the device under test;
filtering out the second mode from the reflected portion of the optical signals that propagated through the device under test; and
calculating wavelength-dependent multi-path interference values.

21. A method comprising:
setting a first mode to be filtered out of optical signals;
setting a second mode to be filtered out of reflected portions of the optical signals;
transmitting a series of the optical signals within a range of an O-band through a U-band, via a test system, into a device under test comprising one or more passive optical components;
filtering out the first mode from the optical signals that propagated through the device under test;
measuring powers of the optical signals that propagated through the device under test;
calculating wavelength-dependent insertion loss values based on the measured powers of the optical signals;
filtering out the second mode from the reflected portions of the optical signals that propagated through the device under test;
measuring powers of the reflected portions of the optical signals that propagated through the device under test;
calculating wavelength-dependent return loss values based on the measured powers of the reflected portion of the optical signal; and
calculating wavelength-dependent multi-path interference values.

* * * * *